(12) United States Patent
Radcliff

(10) Patent No.: US 11,828,553 B1
(45) Date of Patent: Nov. 28, 2023

(54) SYSTEMS AND METHODS FOR LOCKING AND UNLOCKING A GUN

(71) Applicant: MVP GROUP, Seattle, WA (US)

(72) Inventor: Jaime Radcliff, Des Moines, WA (US)

(73) Assignee: MVP GROUP, Seattle, WA (US)

( * ) Notice: Subject to any disclaimer, the term of this patent is extended or adjusted under 35 U.S.C. 154(b) by 0 days.

(21) Appl. No.: 17/352,004

(22) Filed: Jun. 18, 2021

Related U.S. Application Data

(62) Division of application No. 16/430,436, filed on Jun. 4, 2019, now Pat. No. 11,073,352.

(60) Provisional application No. 62/680,045, filed on Jun. 4, 2018.

(51) Int. Cl.
*F41A 17/06* (2006.01)
*F41A 17/54* (2006.01)

(52) U.S. Cl.
CPC ............ *F41A 17/066* (2013.01); *F41A 17/54* (2013.01)

(58) Field of Classification Search
CPC ............................... F41A 17/066; F41A 17/54
USPC ......................................................... 42/70.11
See application file for complete search history.

(56) References Cited

U.S. PATENT DOCUMENTS

| | | | | |
|---|---|---|---|---|
| 4,532,729 A * | 8/1985 | Von Muller | ............ | F41A 17/02 42/70.11 |
| 4,858,799 A * | 8/1989 | Young | ................ | F41C 33/0209 42/95 |
| 5,094,376 A * | 3/1992 | Baruch | ............... | F41C 33/0263 224/244 |
| 5,215,238 A * | 6/1993 | Baruch | ................. | F41C 33/046 224/244 |
| 5,782,029 A * | 7/1998 | Brooks | ................... | F41A 17/38 42/70.11 |
| 5,987,796 A * | 11/1999 | Brooks | ................... | F41A 17/38 42/70.11 |
| 6,052,934 A * | 4/2000 | Carpenter | ............... | F41A 17/44 42/70.11 |
| 6,230,946 B1 * | 5/2001 | Vor Keller | ............ | F41A 17/066 224/244 |
| 6,256,919 B1 * | 7/2001 | Brazeau | .................. | F41A 17/44 42/70.11 |
| 9,784,515 B2 * | 10/2017 | Haimi | ...................... | F41A 17/54 |
| 9,970,725 B2 * | 5/2018 | Kiyani | ..................... | F41A 17/06 |
| 11,073,352 B1 * | 7/2021 | Radcliff | ................. | F41A 17/066 |
| 2002/0158095 A1 * | 10/2002 | Vor Keller | .............. | F41A 23/18 224/244 |

(Continued)

*Primary Examiner* — Samir Abdosh
(74) *Attorney, Agent, or Firm* — PELOQUIN, PLLC; Mark S. Peloquin, Esq.

(57) ABSTRACT

An external lock apparatus for a gun includes a gun receptacle. The gun receptacle is configured to receive a portion of the gun. An external lock is configured to engage with the portion of the gun when the gun is inserted into the gun receptacle. The external lock has on OPEN position and a LOCKED position. The external lock further includes an interference member. The interference member is configured to engage with the gun such that the gun cannot be removed from the gun receptacle and the gun cannot fire when the portion of the gun is received within the gun receptacle and the external lock is in the LOCKED position. In the alternative, the gun cannot be fired but can be removed from the gun receptacle if the portion of the gun is received within the gun receptacle and external lock is in the OPEN position.

11 Claims, 28 Drawing Sheets

(56) References Cited

U.S. PATENT DOCUMENTS

| | | | |
|---|---|---|---|
| 2004/0025394 A1* | 2/2004 | Young | F41A 17/44 |
| | | | 42/70.11 |
| 2016/0054080 A1* | 2/2016 | Haimi | F41A 17/54 |
| | | | 70/263 |
| 2016/0054083 A1* | 2/2016 | Kiyani | F41A 17/066 |
| | | | 42/70.11 |
| 2018/0100715 A1* | 4/2018 | Bordley | F41A 17/54 |
| 2018/0335267 A1* | 11/2018 | Kiyani | F41A 17/063 |
| 2019/0186868 A1* | 6/2019 | Cordero Pardo | F41C 33/029 |
| 2020/0400398 A1* | 12/2020 | Dulude | F41A 17/38 |

* cited by examiner

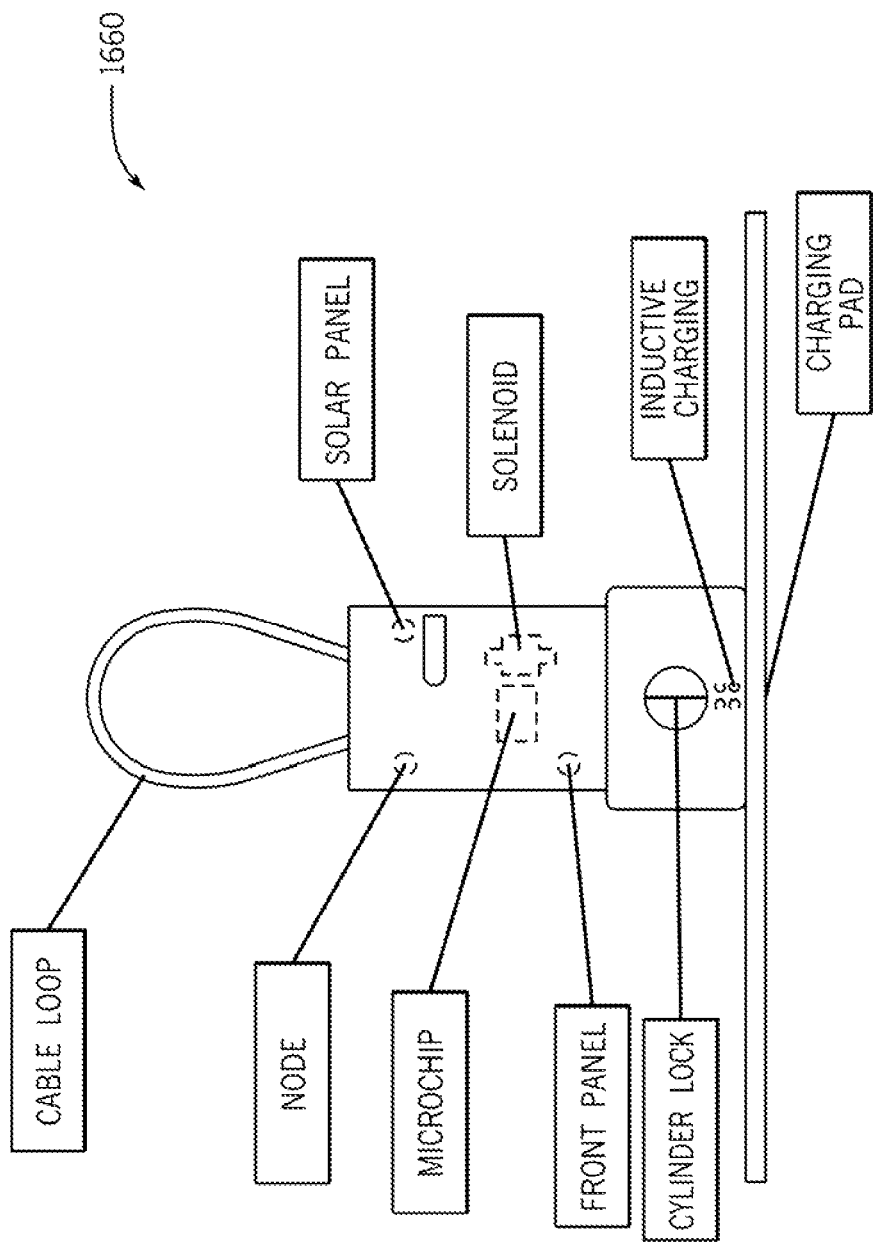

SYSTEMS AND METHODS FOR LOCKING AND UNLOCKING A GUN

RELATED APPLICATIONS

This patent application is a Divisional of United States Non-Provisional Patent Application Ser. No. 16/430,436 filed on Jun. 04, 2019, which claims priority from United States Provisional Patent Application Ser. No. 62/680,045 filed on Jun. 04, 2018, titled: "SYSTEMS AND METHODS FOR LOCKING AND UNLOCKING A GUN." U.S. Provisional Patent Application Ser. No. 62/680,045 is hereby incorporated by reference. U.S. Non-Provisional Patent Application Ser. No. 16/430,436 is hereby incorporated by reference.

BACKGROUND OF THE INVENTION

1. Field of Invention

The invention relates generally to locking a gun.

2. Art Background

Guns and ammunition are used in a variety of settings from a private personal setting to a club setting in the context of a shooting range, to a law enforcement setting of a municipal police department to a military setting in a theater of war.

Regardless of the setting employed for use of a gun/or ammunition safety measures are employed in order to restrict access to the gun or to disable the gun so that it cannot fire. A safety mechanism is a well known device that is used to disable a gun so that it cannot fire. During use, a safety is moved to an off position in order to enable the gun to fire. A safety mechanism does not distinguish between an authorized user of the gun and an unauthorized user of the gun. This can present a problem since guns have been stolen, misappropriated, etc. by unauthorized users and then used to commit crimes or have been accidentally discharged by children for example, thereby causing injury.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 16C Illustrates a gun lock configured a magazine lock on a wireless charger according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described for locking a gun. As used in this description of embodiments, when a gun is locked, it cannot be fired. In some embodiments, a gun is locked such that it cannot be fired, and the gun is fastened within a holster while it is locked. In other embodiments, a gun is locked such that it cannot be fired, and the gun is fastened down to a structure such as a wall, an automobile, etc. while it is locked. In some embodiments, a gun lock is configured into a communications network such that the state of the lock can be changed remotely, and/or the status of the lock can be monitored by the network. As required by the functionality provided in a given embodiment, a gun lock might be provided with a source of electrical power such as a battery and battery charging capability, such as but not limited to solar charging or wireless charging capability. As used in this description of embodiments, a lock that is used to lock a gun is an external lock which is not a built-in lock such as a built-in safety. The terms "gun lock," "external lock" and "external lock for a gun," and the like will be used interchangeably in this description of embodiments.

Figure 1A:
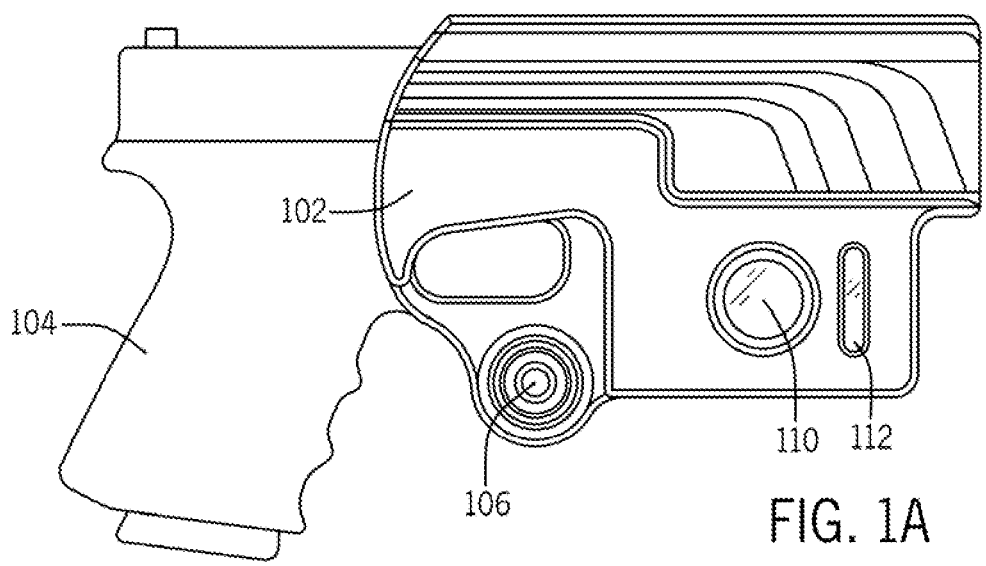
FIG. 1A-FIG. 1G illustrate multiple views of a gun lock in accordance with embodiments of the invention.
Figure 1B:
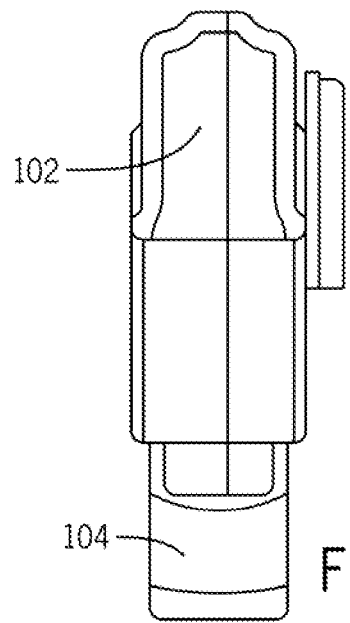
Figure 1C:
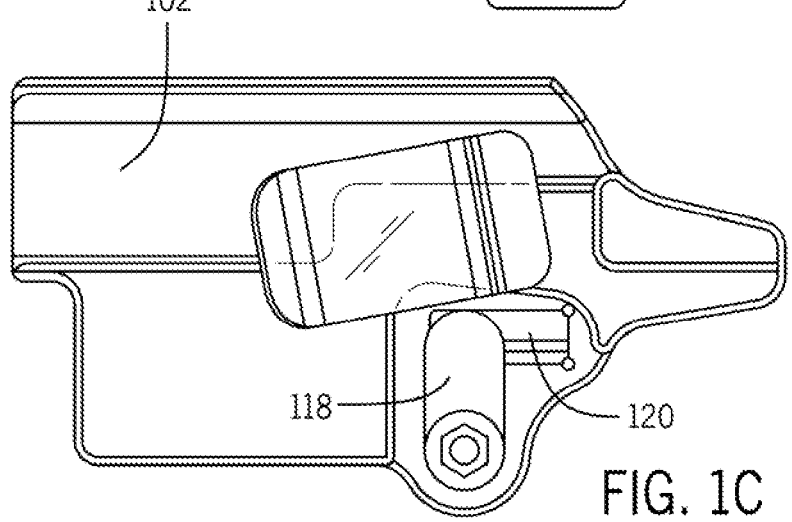
Figure 1D:
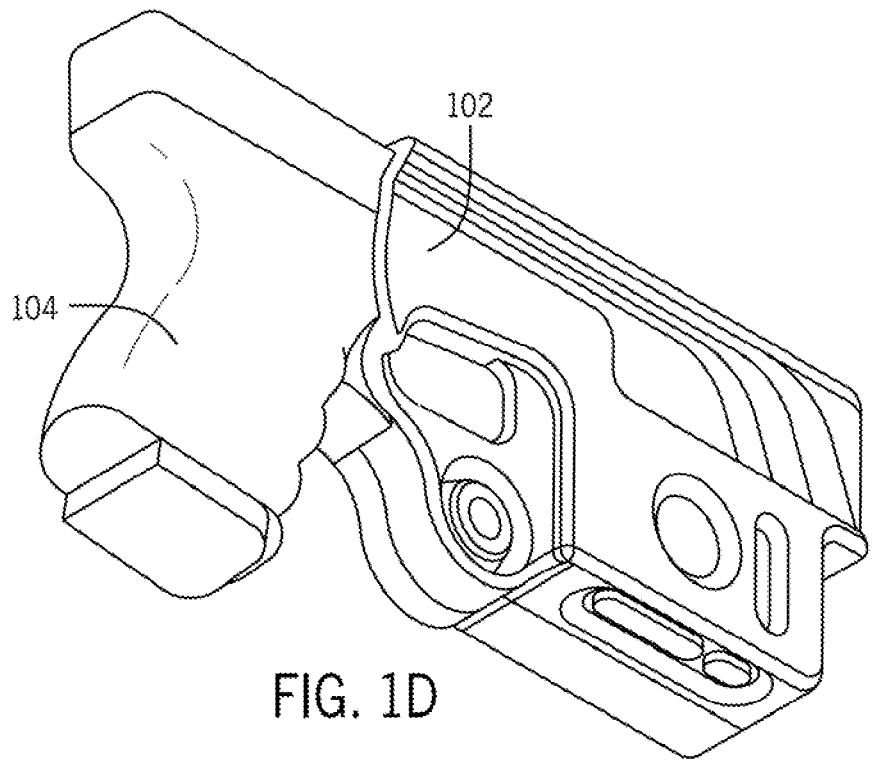
Figure 1E:
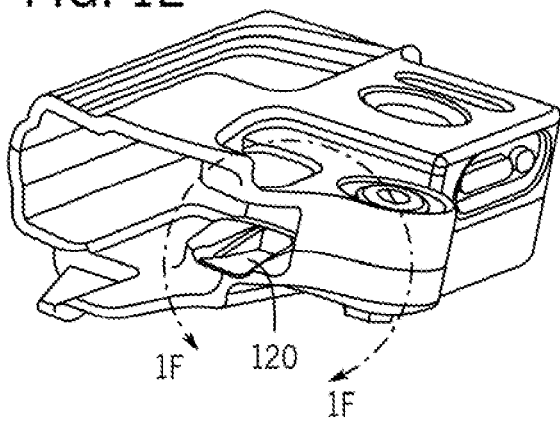
Figure 1G:
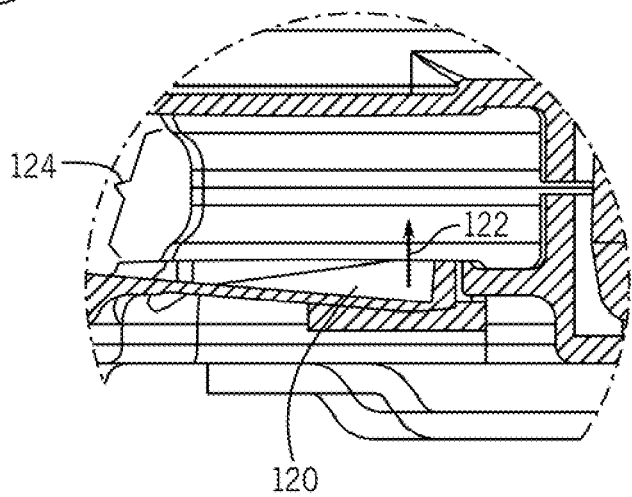
Figure 1F:
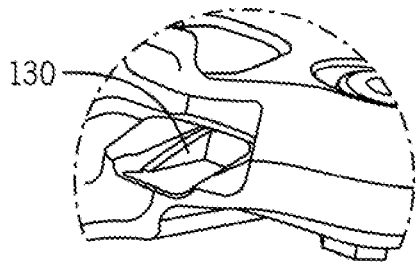

FIG. 1A through FIG. 1G illustrate multiple views of an external lock for a gun in accordance with embodiments of the invention. FIG. 1A is a right-side view. FIG. 1B is a front view. FIG. IC is a left-side view. FIG. 1D is a lower rear perspective view. FIG. 1E is an enlarged rear perspective view. FIG. 1F is a zoom of FIG. 1E. FIG. 1G is cross-section taken through the interference member 120. With reference to FIG. 1A through FIG. 1G collectively, an external gun lock 102 is configured for a handgun 104 as illustrated. In use, a portion of the handgun 104 is inserted into a gun receptacle having an opening as indicated at 124. In the embodiment shown, a portion of the gun barrel and the trigger guard of the gun are inserted into the opening. In one or more embodiments, an interference member 120 is forced into the trigger guard when a swing arm 118, operable by the external lock 106, slides over the interference member 120, thereby fastening the handgun 104 into the gun lock 102 and preventing the trigger of the handgun (not shown) from operating by the presence of the interference member 120 and the gun lock 102. The interference member 120 shown is in a form of a flexible lock wedge. In other embodiments, the interference member 120 can rotate on a hinge and need not be flexible. Thus, the flexible wedge 130 is illustrated merely as an example and does not limit embodiments of the invention. In other embodiments, the interference member is an extendable member that wraps around the handgun, an example of which is illustrated in one embodiment on FIG. 5A at 512.

Referring back to FIG. 1A through FIG. 1G collectively, when the swing arm 118 slides over the lock wedge 120 the lock wedge 120 is moved in a direction as indicated by the arrow 122, which places the lock wedge 120 within the trigger guard. Placing the look wedge within the trigger guard prevents the handgun 104 from being removed from the gun lock 102 and the handgun cannot be fired because the trigger cannot be accessed by a user. Thus, the handgun 104 is fastened to the gun lock 102 and is inoperable while so fastened.

Figure 15A:
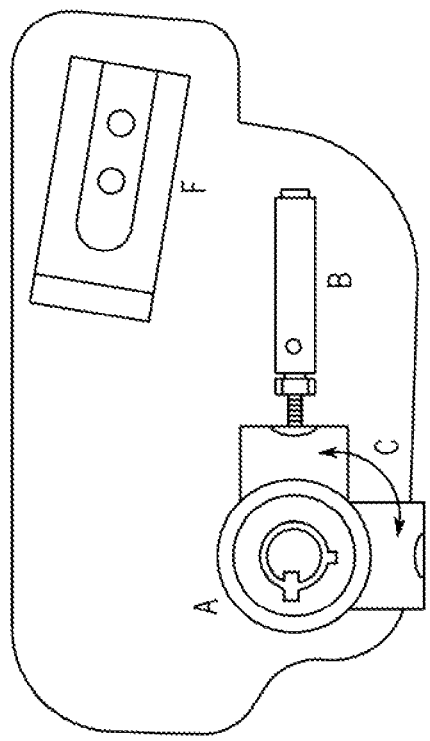
FIG. 15A-FIG. 15D illustrate various lock arrangements, some of which incorporate a biometric according to embodiments of the invention.
Figure 15A:
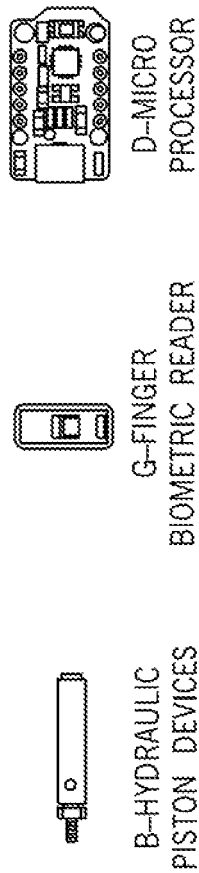
Figure 15B:
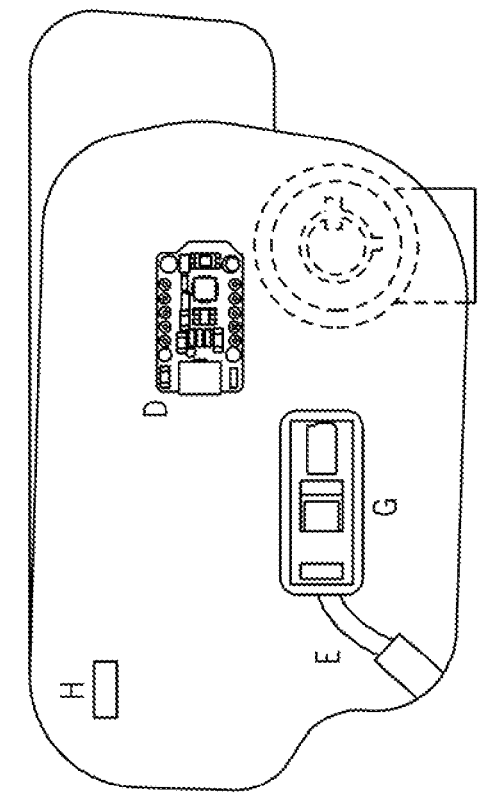
Figure 15C:
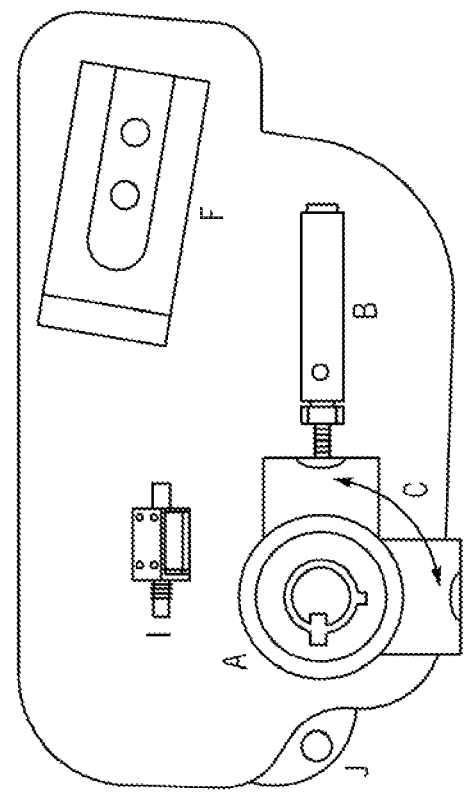
Figure 15C:
Figure 15D:
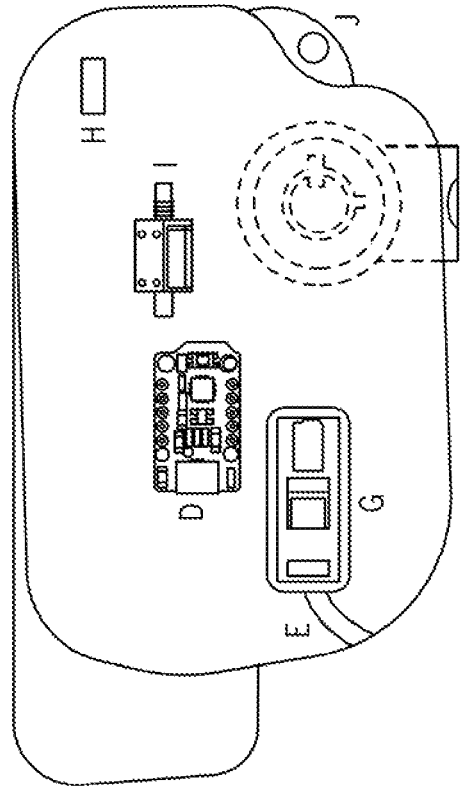
Figure 15D:
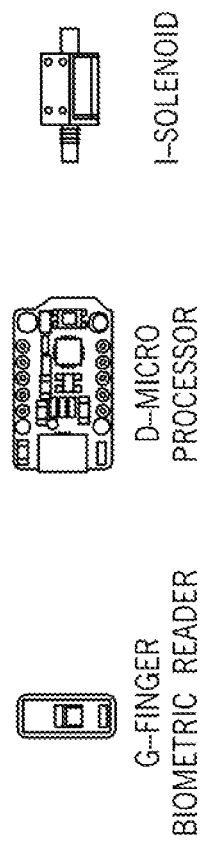

In one or more embodiments, a gun lock 102 is fitted with an SOS window 110. An SOS window 110 can include an SOS cover (not shown). In various embodiments, an SOS button is accessed by a user through the SOS window and cover when present. In operation, when activated by a user, the SOS button causes communication with the system described below thereby notifying a remote system that an event has occurred. Location of the gun can be communicated through activation of the SOS button by the user. Events are described more fully in U.S. patent application Ser. No. 13/938,437. U.S. patent application Ser. No. 13/938,437 is hereby incorporated by reference. In one or more embodiments, the gun lock 102 is configured with a window 112 for a view of a light, such as for example, an LED (light emitting diode). The light can be used to communicate information to the user, such as, but not limited to; a.) the gun lock is in communication with the system, b.) the lock is engaged, c.) the lock is disengaged, etc. Different colors can be used to communicate different logical states of the lock to the user. For example, light "off" can represent an "unlocked" state. Light "on" color green can represent a "locked" state. Light "on and blinking" can represent communication successfully made with the system to report an event, i.e., a "reporting" state. The foregoing represents, in various embodiments, several logical states for the system communicated through the use of one or more lights and are provided herein merely for example. The operation of the system is not limited to the logical states given by example herein. Biometric functionality is described more fully below in conjunction with for example FIG. 15A thorough FIG. 15D and others.

Referring back to FIG. 1A through FIG. 1G collectively, in one or more embodiments, the lock illustrated is a mechanical lock 106 operable with a cylindrical key, flat key, etc. However, embodiments of the invention are not so limited. Mechanical locks operable with other key configurations are used in various embodiments. For example, in other embodiments, described in conjunction with the figures below, a gun lock is provided with lock and release functionality operable by a biometric (e.g., fingerprint recognition), combination lock via buttons or touch pad, sound capture and analysis based on user training to specific speech, etc.

In various embodiments, a locking/unlocking holster will include a biometric and/or a voice sensor to provide lock and unlock functionality by fingerprint recognition or voice recognition. in such implementations, the locking/unlocking holster includes sensor(s) to record a user's fingerprint for comparison with fingerprints of users who are permitted to access the gun. When configured with voice recognition capability the locking/unlocking holster will record a user's voice for analysis to determine if the user is a user that is permitted to unlock the holster. In some embodiments, a biometric includes eye recognition and processing of images taken of a user's eye to determine whether the user is a permitted user of the gun. A gun lack is then operable based on a determination made between the image taken of the user and data stored previously for permitted users of the gun or gun lock. Thus. the term "biometric" as used in this description of embodiments includes fingerprint recognition, voice recognition, and eye recognition.

In some embodiments, a gun lock includes, but is not limited to, an automatic locking mechanism that operates once the contents are put inside of the gun lock. In various embodiments, the locked mechanism when in the locking position can be unlocked with a key, biometrics, sound, etc. In various embodiments, an on/off switch is used to enable or disable the locking mechanics, so the contents can be put inside the gun lock or gun holster without automatically locking. The locking mechanism is of a mechanical nature and can also include computer processing functionality that controls the locking and unlocking functions through implementation of a microprocessor locally within the gun lock. Variations of the locking mechanism can be inserted in multiple places around a holster or gun lock.

In various embodiments, a locking unlocking holster will include a mounting device for attachment to a wall, car, etc. In various embodiments, the locking and unlocking holster will also have but will not be limited to indicator lights for one or more or all of the features provided therein.

In various embodiments, a locking and unlocking holster design will be able to fit all types of handguns, rifles, long guns, etc.

In various embodiments, a locking and unlocking mechanism can be connected to a wired or wireless alerting node(s) as described more fully below and provide status as to the lock. Alternatively, or in addition thereto, a gun lock is provided with wired or wireless control from a remote host to control the lock remotely. A more complete discussion of control from a host is provided below in conjunction with FIG. 14.

The gun lock shown in FIG. 1A through FIG. 1G as well as in the other figures below and the magazine locks shown in the figures below can be made with one or more different materials such as metal and plastic or a combination of metal and plastic. In some embodiments, a gun lock and the parts thereof are made with a three-dimensional (3D) printing process. In other embodiments, the gun lock and the parts thereof are made by machining metal and or plastic. In other embodiments, plastic is molded to create the parts of a gun lock. In some embodiments, injection molding is used. Any combination of manufacturing processes can be used to make one or more parts of a gun lock according to embodiments of the invention.

Figure 2A:
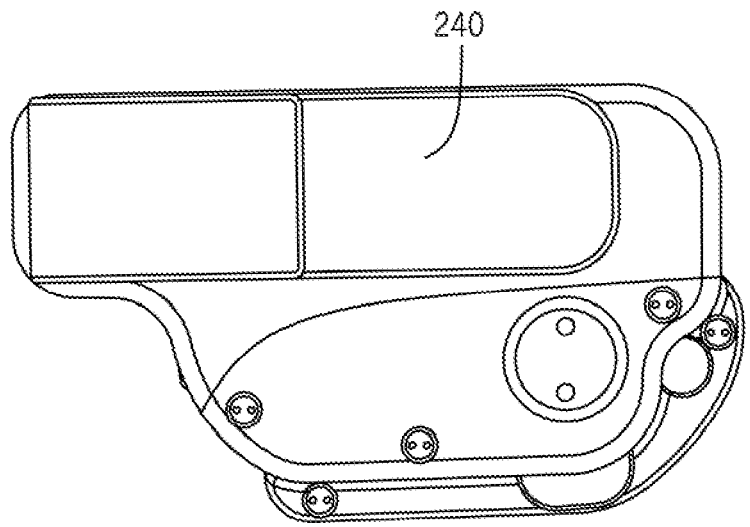
FIG. 2A-FIG. 2H illustrate views of a gun lock in accordance with embodiments of the invention.
Figures 2B, 2C:
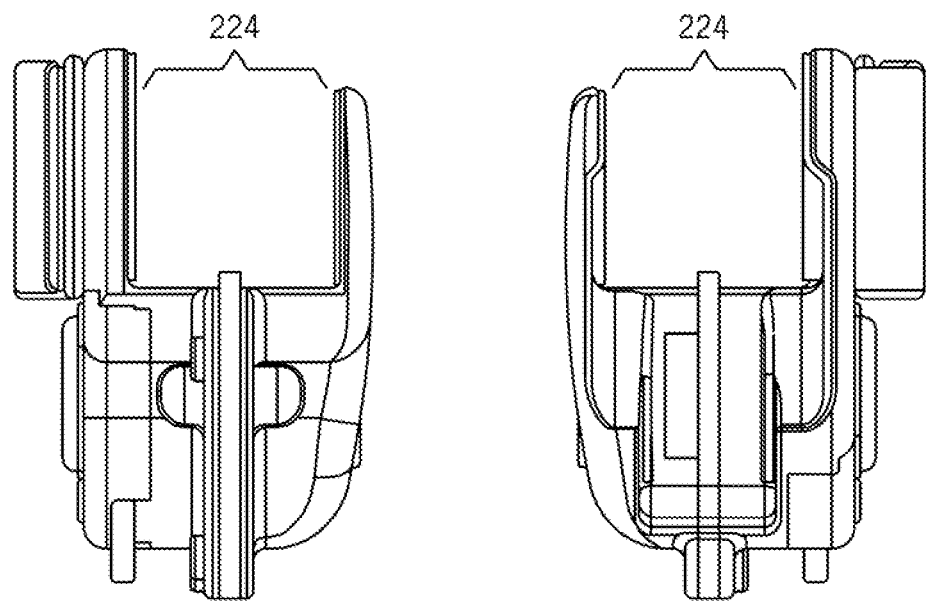
Figure 2D:
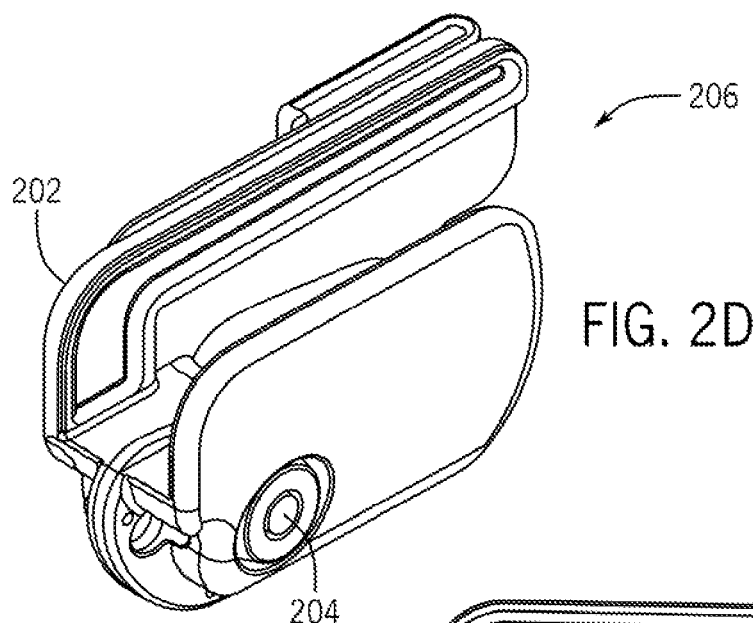
Figure 2E:
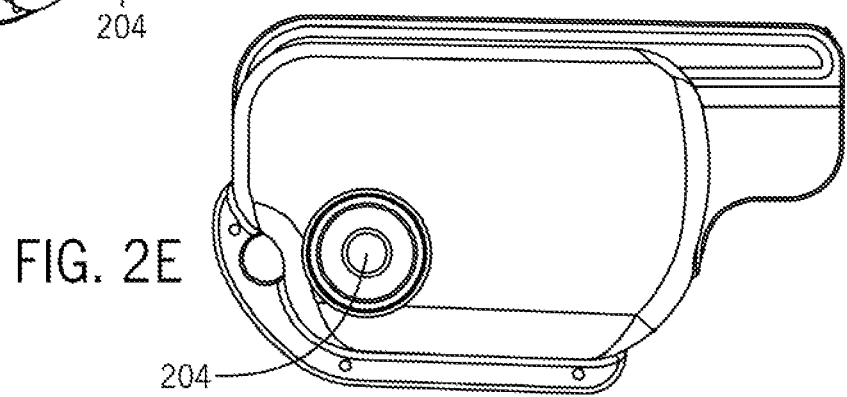
Figure 2F:
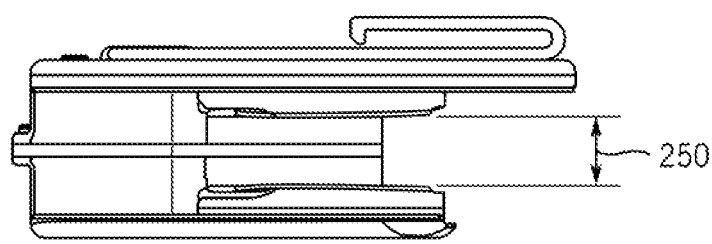
Figure 2G:
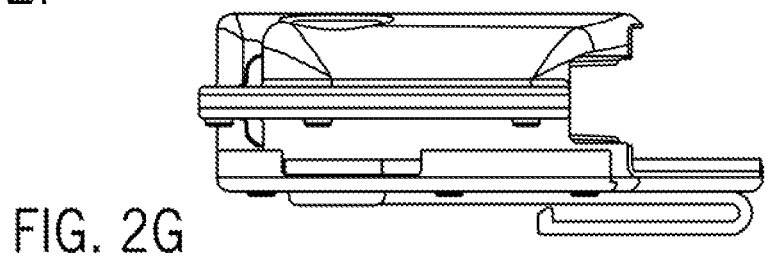
Figure 2H:
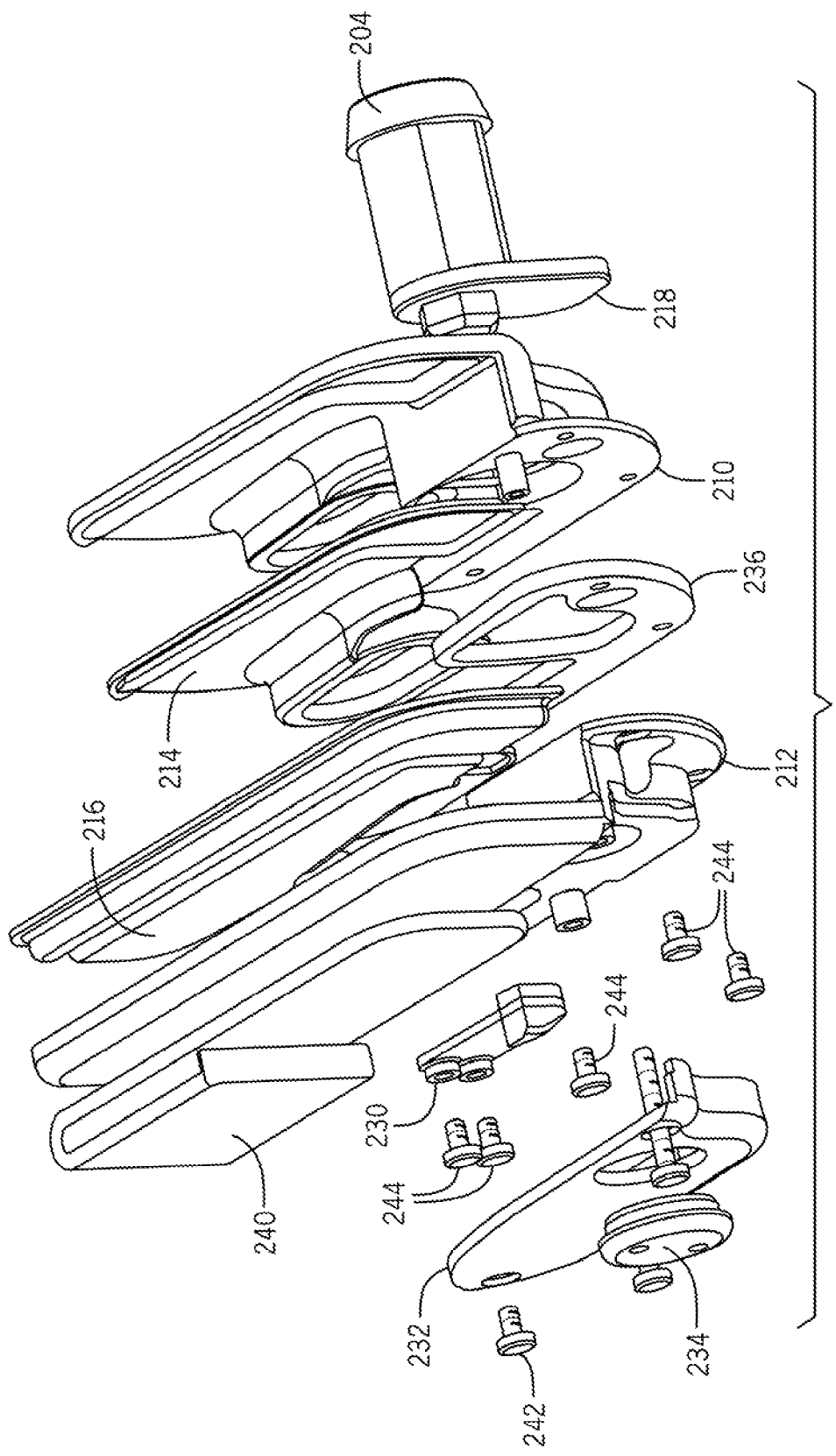

FIG. 2A through FIG. 2H illustrate views of a gun lock in accordance with embodiments of the invention. FIG. 2A is a right-side view. FIG. 2B illustrates a front view. FIG. 2C illustrates a back view. FIG. 2C illustrates front perspective view, FIG. 2E illustrates a left-side view. FIG. 2F illustrates a top view. FIG. 2G illustrates a bottom view. FIG. 2H illustrates a front perspective exploded view. With reference to FIG. 2A through. FIG. 2H collectively, a gun lock is illustrated with the key receptacle re-located to the front of the trigger guard. The gun lock 202 is illustrated without a handgun installed. In operation, a portion of a handgun is inserted in a direction shown by an arrow 206. The gun receptacle of the gun lock 202 has an opening as indicated at 224 and 250. When a portion of a handgun is inserted into the opening, a trigger guard of the handgun comes into a range of the interference member 230.

In operation, a lock cylinder 204 is rotated by a user with a key that causes a swing arm 218 to rotate and to press an end of the interference member 230 into the trigger guard of the handgun. The key can be removed from the lock cylinder 204 leaving the lock in the locked position.

In some embodiments, the gun lock 202 is made from a left body 210 and a right body 212. Within the left body 210 and the right body 212 is right spacer 216, a gasket 236, and a left spacer 210. Thicknesses of the right spacer 216, the left spacer 210, and the gasket 236 are varied either individually, or in combination as needed, to accommodate different dimensions of handguns. Thus, a width 224 and/or 250 is varied thereby.

In some embodiments, a cover 232 and a cover 234 are provided. Mechanical means of assembly such as screws 242 and 244 are used to secure the components of the gun lock 202 together. The gun lock 202 can be used with a belt clip 240 to fasten the gun lock 202 to a belt thereby creating a holster.

Figure 3A:
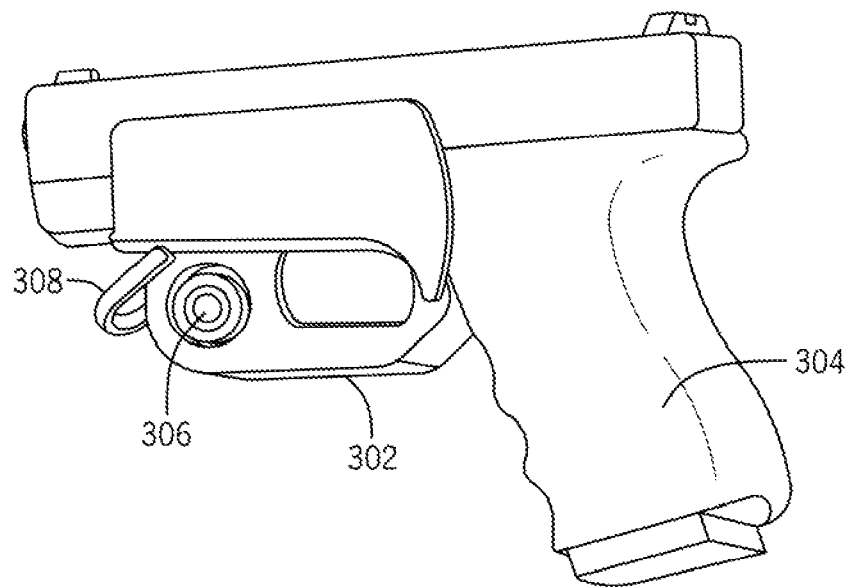
FIG. 3A-FIG. 3B illustrate views of a gun lock with tether point in accordance with embodiments of the invention.

FIG. 3A illustrates views of a gun lock 302 with a portion of a handgun 304 inserted into the gun lock 302. A lock 306 is illustrated as a cylindrical key lock. The cylindrical key lock 306 operates an interference member to lock the handgun into the gun lock 302. In some embodiments, a tether point is indicated at 308. With reference to FIG. 3A, a gun lock 302 is illustrated in the upper view that provides locking functionality as described above. The lock is configured with a ring 308 to provide a tether point for the lock.

Figure 3B:
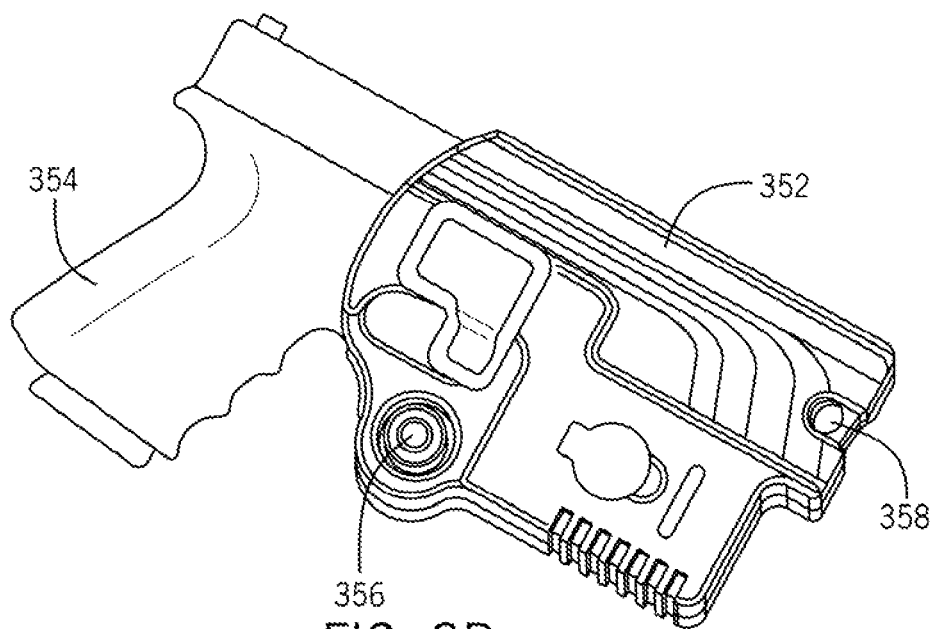

FIG. 3B illustrates a gun lock 352 that provides a receptacle for the gun barrel and a tether point 358 by means of a hole through the frame of the gun lock 353. A portion of the handgun 354 is inserted into the gun lock 352 and a cylindrical key lock 356 is used to operate an interference member to lock the handgun 354 into the gun lock 352.

Figure 4A:
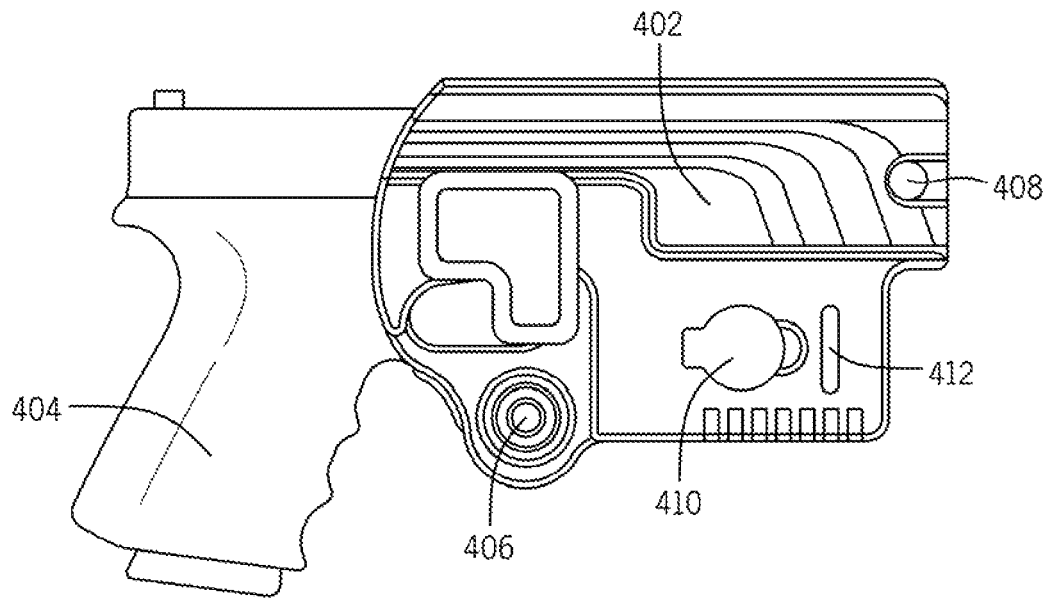
FIG. 4A-FIG. 4E illustrate multiple views of a gun lock with electronics unit in accordance with embodiments of the invention.
Figure 4B:
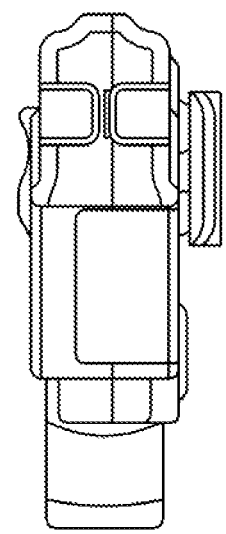
Figure 4C:
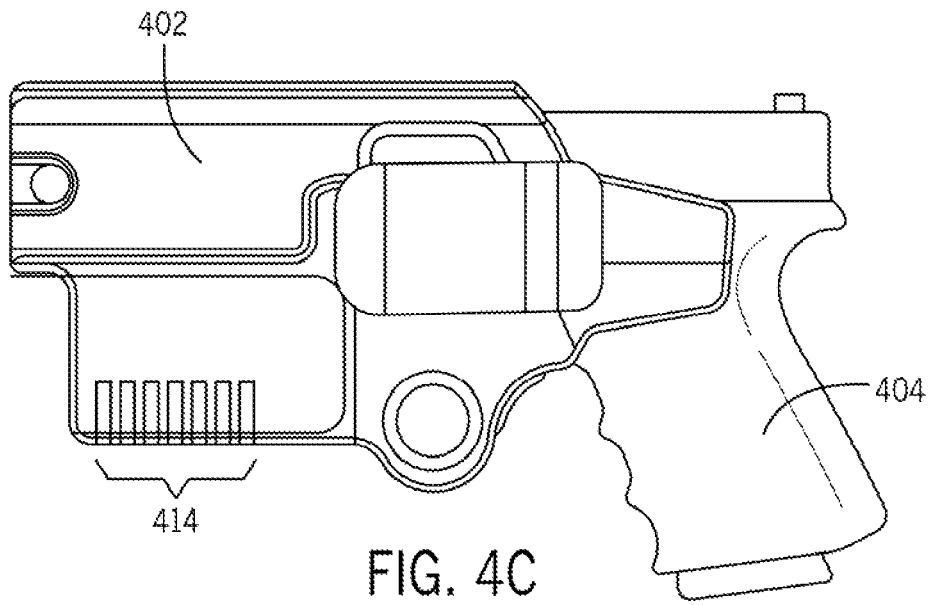
Figure 4D:
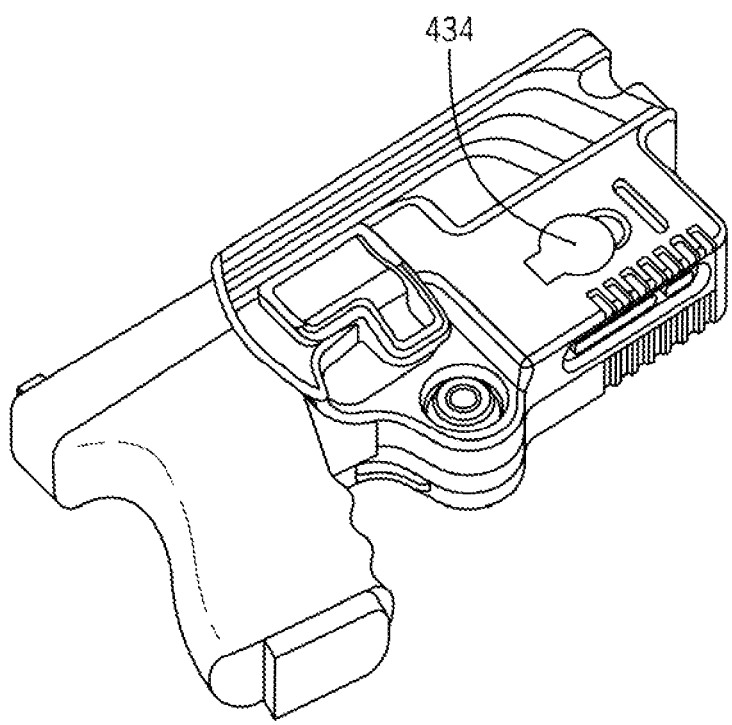
Figure 4E:
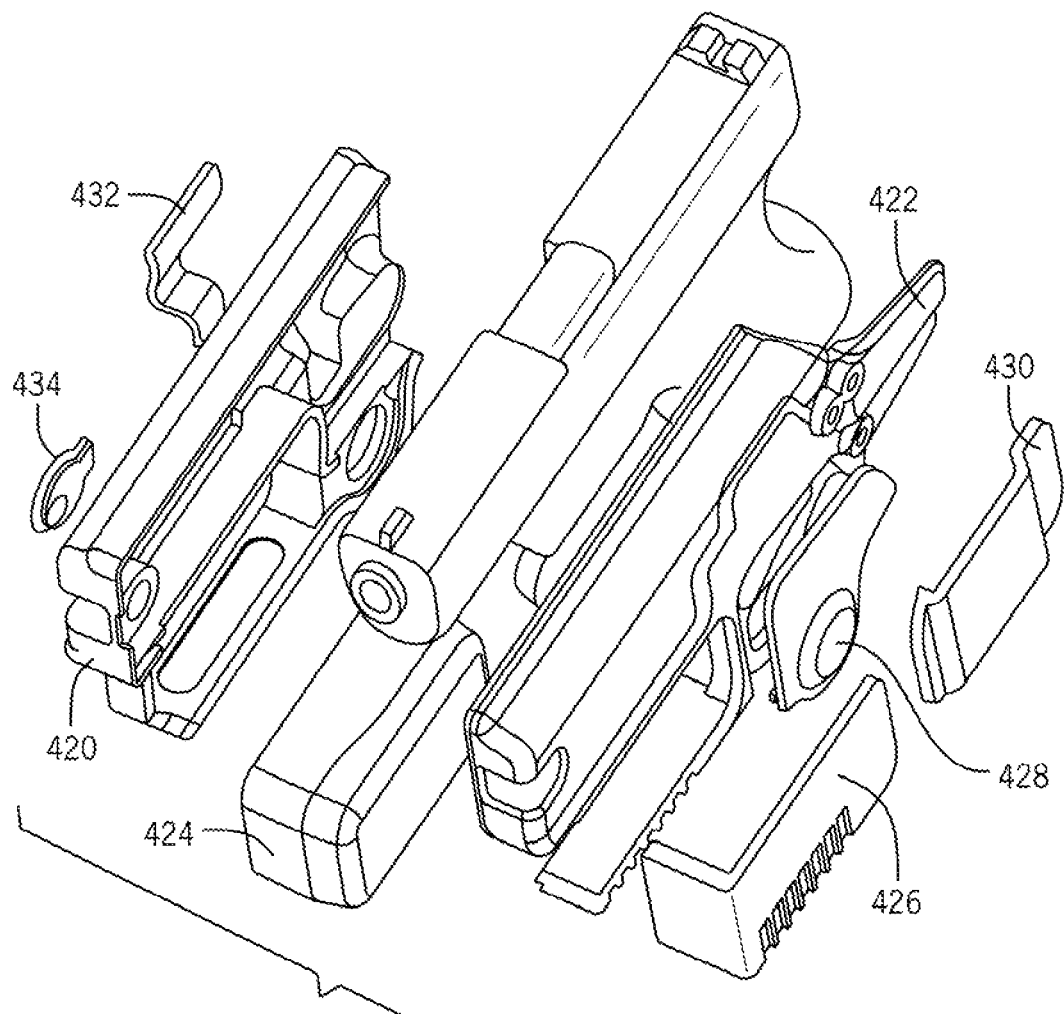

FIG. 4A through FIG. 4E illustrate multiple views of a gun lock with an electronics unit in accordance with embodiments of the invention. FIG. 4A is a right-side view. FIG. 4B is a front view. FIG. 4C is left-side view. FIG. 4D is a perspective right-side view. FIG. 4E is a front perspective view. With reference to FIG. 4A through FIG. 4E collectively, a gun lock 402 is illustrated with a portion of a handgun 404 inserted therein. The gun lock 402 is lockable with a lock 406. The lock 406 can be implemented in various ways according to a design of a particular embodiment. For example, in some embodiments, as described above, the lock 406 is a mechanical lock such as a lock operated with either a cylindrical key or a flat key. In operation, a user inserts a key into the lock 406 and rotates the key thereby moving the lock from an open state to a locked state or vice versa. In some embodiments, the lock 406 is operated with a biometric sensor used in conjunction with a microprocessor in an electronics unit 424. In some embodiments, a mechanical lock such as a cylindrical or flat key lock mechanism is used in conjunction with a senor such as a magnetic sensor. Upon rotation of the mechanical lock cylinder, a state of the sensor is changed thereby. For example, in operation, a swing arm as described above (118 in FIG. 1C or 218 in FIG. 2H) is used to trigger a magnetic sensor or to close a contact within a switch, etc. thereby an electrical signal responsive to mechanical movement of the lock 406 is available to provide information thereby. Thus, a gun lock 402 can contain a hybrid mechanical/electrical lock as described herein that provides information related to a state of the gun lock 402.

When the gun lock 402 has an electronics unit 424 incorporated therein, additional functionality is achieved. The electronics unit 424 includes, in various embodiments a microprocessor and one or more sensors. The sensors include, but are not limited to, a sensor such as a biometric sensor to function as a lock 406 and/or sensors that are used to detect a status of the gun lock. One or more biometric sensors are implemented to permit an authorized user to lock and unlock the gun lock 402. Biometric sensors are described more fully below in conjunction with FIG. 15A through FIG. 15D and can include, fingerprint identification, voice recognition, identification through a parameter of a user's eye, etc. When a biometric sensor is used in the gun lock 402 the microprocessor is used together with an electromechanical actuator, such as a solenoid to unlock or lock an interference member that is used to lock the handgun 404 to the gun lock 402 to facilitate audible messages.

The status or state of the gun lock 402 can include but is not limited to—unlocked or locked, etc. As used in this description of embodiments, the words "state" and "status" are used interchangeably with respect to a gun lock. In addition, the gun lock 402 can include an indicator such as a light 412 that is responsive to a state of the gun lock. For example, in one or more embodiments, a color of a light is used to inform the user of the state of the gun lock 402. Information is communicated to a user by the color of the light and the behavior of the light as a function of time. For, example a light can be on with constant illumination or a light can blink with intermittent illumination.

The status of the gun lock 402 can also be communicated to the user with a built-in speech processing. The speech processor generates audible words that are used to communicate the status of the gun lock 402 to the user. 414 indicates a speaker built into the gun lock 402.

In some embodiments, the gun lock 402 has a tether point 408 and/or a belt clip 430.

In the view presented in FIG. 4E the gun lock 402 is illustrated in an exploded view. Note that, in the embodiment shown, the gun lock 402 is configured from an outside frame 420 and an inside frame 422. In other embodiments, additional components are used such as were described above in conjunction with FIG. 2H. For example, one or more of 210, 216, and 236 (FIG. 2H).

In some embodiments, the electronics unit 424 is included in the gun lock 402. In some embodiments, the electronics contained in the electronics unit 424 can be used to facilitate operation of the lock and/or communications with a network as described herein. An electronics unit cover 426 is optionally provided as well as an optional belt clip 430. Other optional components are a lock tamper hood 428, which can protect whatever type of lock is used for the lock 406. The lock tamper hood 428 shown in FIG. 4E can be used to cover whatever type of lock is provided at 406. For example, the lock tamper hood 428 can be used to protect a fingerprint sensor used at 406. In some embodiments, the lock 406 is a camera used to capture an image of a potential user's eye. The image is analyzed either at the embedded microprocessor or the image can be sent wirelessly over one or more networks to a remote location for processing to determine whether the potential user is an authorized user. The results of such analysis are then sent back to the gun lock 402 and the interference member is either moved to an unlocked position or it remains in the locked position.

In some embodiments, a gun lock 402 is configured with an SOS alarm that is triggered by a user responsive to a situation in which the user desires assistance from the system. The SOS system includes an SOS sensor or switch 410 which is operable by the user. In one or ore embodiments, pressing the SOS alarm 410 causes a location of the gun lock 402, obtained from one or more Global Position Sensors (GPS), to be transmitted over the network. The system then responds according to a predefined action established by the authorized user. Some examples of predefined actions are but are not limited to; place an emergency call to the 911 service, place a call to the police, etc.

In some embodiments an SOS alarm 410 utilizes a biometric sensor that performs an identification of a potential user. If the potential user is an authorized user, then the SOS procedure is implemented as described above. An optional SOS cover 434 can be provided to prevent the SOS alarm from being triggered accidentally and or to protect the SOS sensor from damage.

Figure 5A:
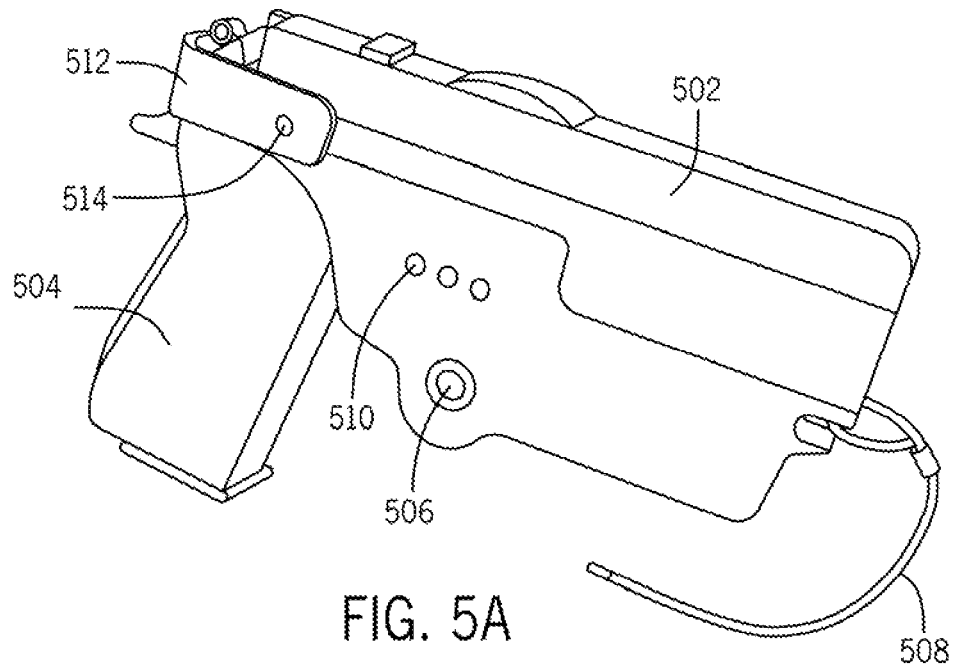
FIG. 5A-FIG. 5B illustrate views of a gun lock with multiple lock mechanisms in accordance with embodiments of the invention.
Figure 5B:
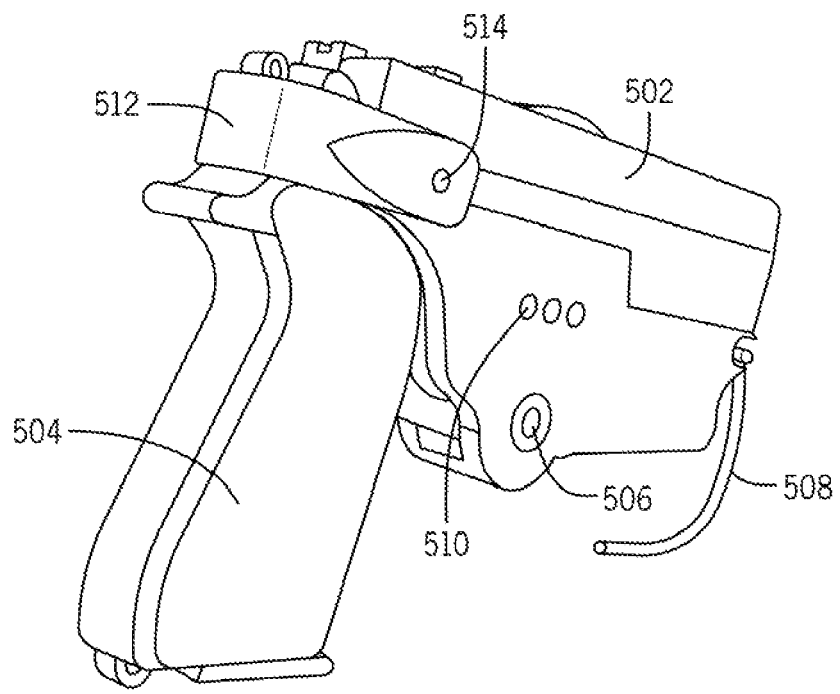

FIG. 5A and FIG. 5B illustrate views of a gun lock 502 with tether point and key access in accordance with embodiments of the invention. With reference to FIG. 5A and FIG. 5B collectively, a gun lock 502 illustrates combining multiple lock interfaces together. For example, a key interface 510 includes three buttons labeled in the figure as 1, 2, and 3. In addition, there is a cylindrical key lock illustrated at 506. In various embodiments, a gun lock 502 is configured to allow a user to use either the key interface 510 or the key lock 506 to operate the lock in order to lock or unlock the handgun.

The gun lock 502 can be constructed utilizing an interference member that moves into the trigger guard thereby locking the handgun to the gun lock 502 as described in conjunction with the figures above. In addition to or in place of a trigger guard lock, an interference member is illustrated at 512. The interference member 512 extends around the handgun 504 and captures the hand stock of the handgun thereby preventing the handgun 504 from being removed from the gun lock 502. Mechanism 514 secures the interference member 512 in place. The key interface of the cylindrical lock 506 can be configured to operate mechanism 514 to release the interference member 512. Mechanism 514 can be constructed from movable cylindrical members made from metal or structural plastic for example. Electromechanical actuators (not shown) are used to prevent movement or to allow movement of cylindrical members 514 responsive to one or more of locks 510 or 506. Note that when the lock 506 is implemented with a rotational mechanism, an electrical sensor is triggered that acts as a switch for the electromechanical actuators that control a state of the cylindrical members 514, e.g., locked or open.

The embodiments illustrated in FIG. 5A and FIG. 5B utilize an optional tether 508.

Figure 6:
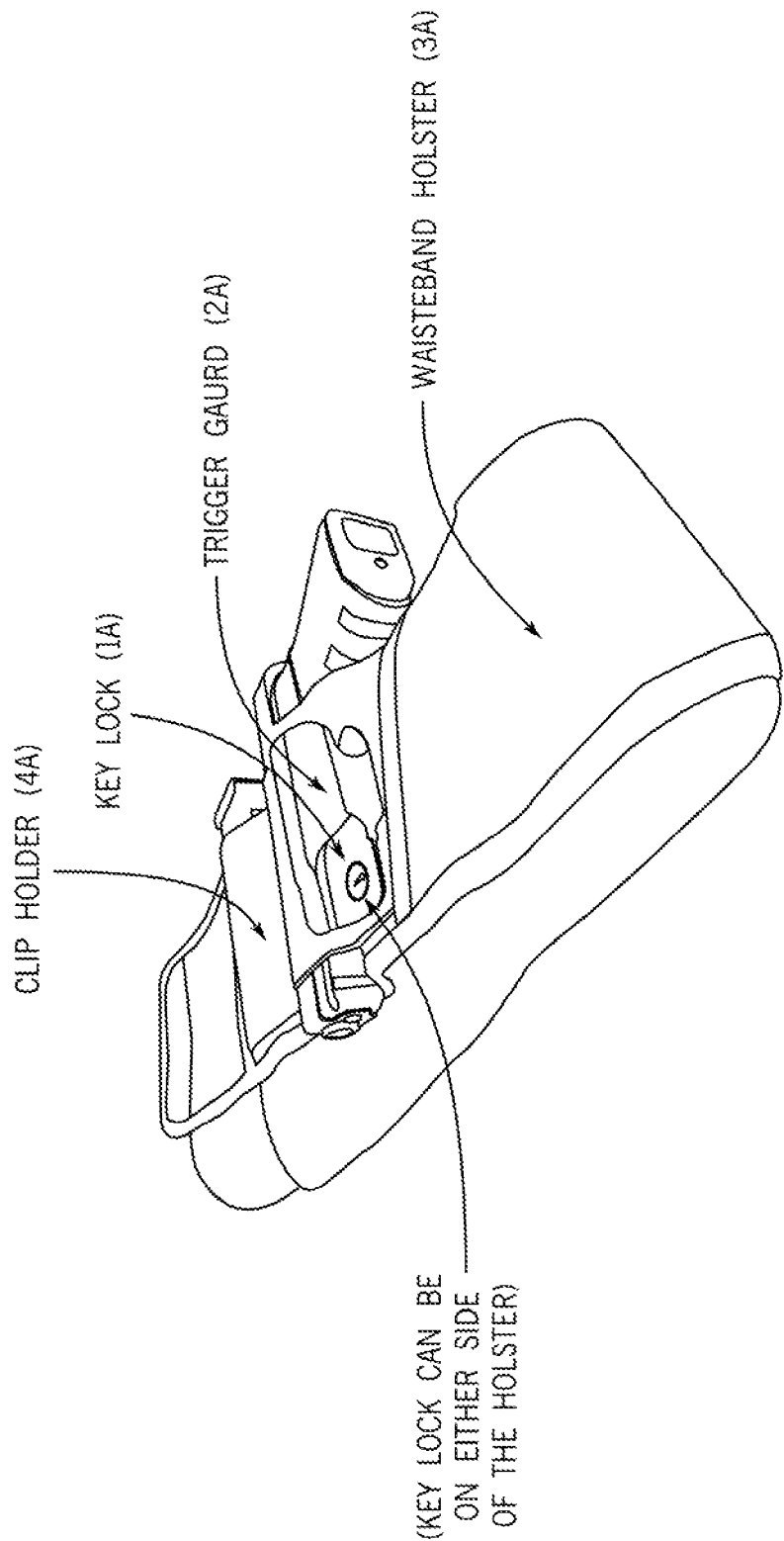
FIG. 6 illustrates a gun lock incorporated into a waistband holster in accordance with embodiments of the invention.

FIG. 6 illustrates a gun lock incorporated into a waistband holster in accordance with embodiments of the invention. As shown in FIG. 6, the lock locks the gun thereto and the assembly is supported by the waistband holster. In the embodiment illustrated, a key lock is illustrated and no limitation is implied thereby. Other embodiments can incorporate other styles of locks and lock functionality as described herein.

Figure 7:
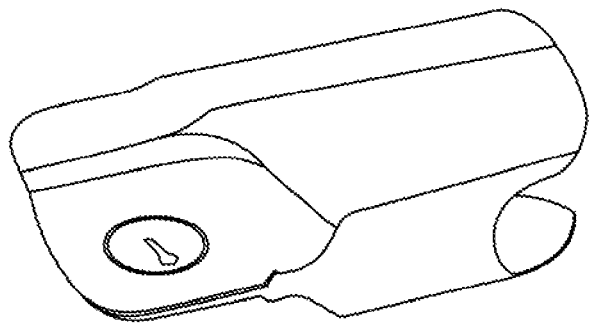
FIG. 7 illustrates another views of a gun lock in accordance with embodiments of the invention.

FIG. 7 illustrates the gun lock from FIG. 6 in accordance with embodiments of the invention.

Figure 8:
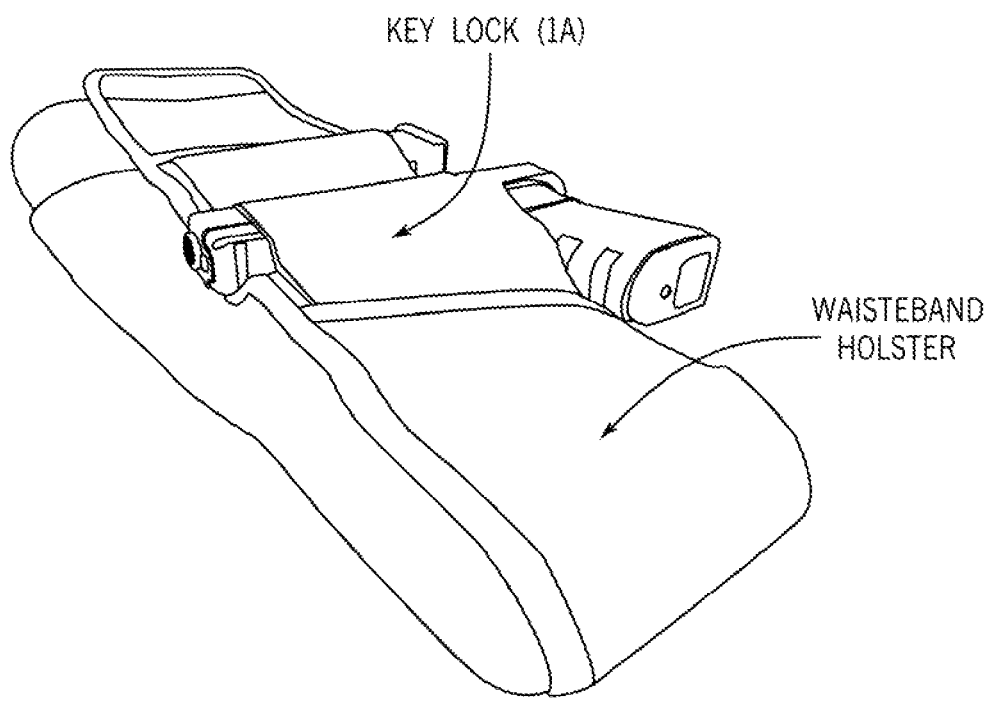
FIG. 8 illustrates a gun lock incorporated into a holster in a first orientation in accordance with embodiments of the invention.

FIG. 8 illustrates a gun lock incorporated into a holster in a first orientation in accordance with embodiments of the invention. With reference to FIG. 8, a gun lock and gun are installed into a waistband holster. A flap of the waistband holster covers the gun lock such that the gun lock is not visible when the gun and lock are installed into the waistband holster.

Figure 9:
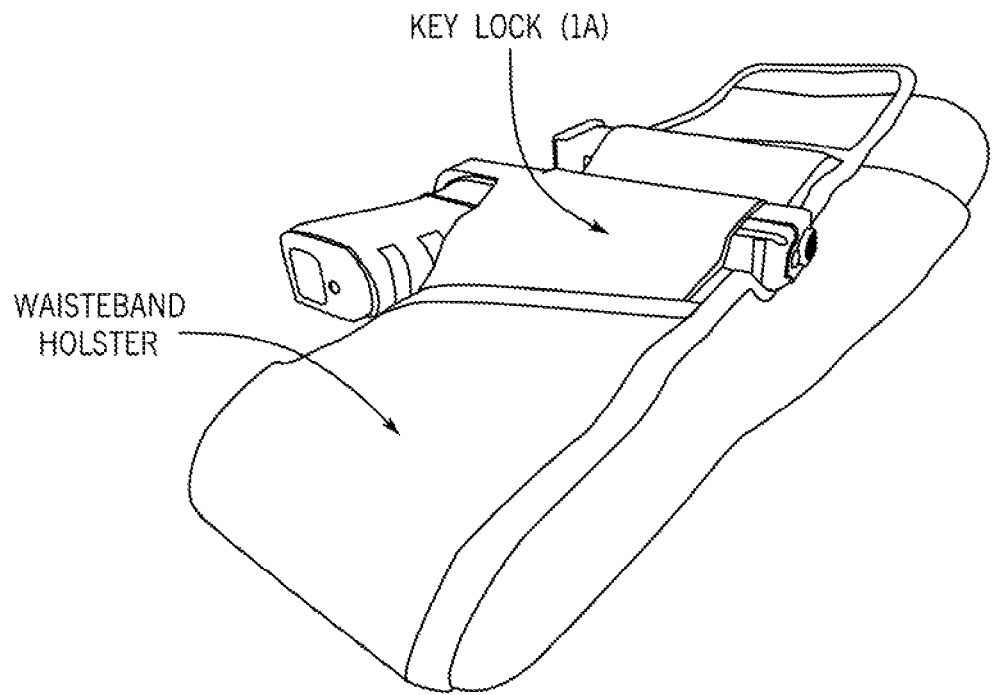
FIG. 9 illustrates a gun lock incorporated into a holster in a second orientation in accordance with embodiments of the invention.

FIG. 9 illustrates a gun lock incorporated into a holster in a second orientation in accordance with embodiments of the invention. With reference to FIG. 9, similar to the view of FIG. 8, a gun lock and gun are installed into a waistband holster, however the orientation of the gun handle is different from the orientation illustrated in FIG. 8.

Figure 10:
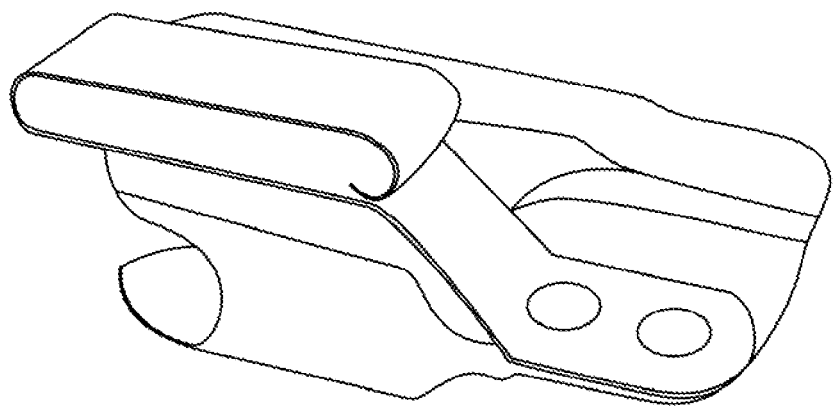
FIG. 10 illustrates the gun lock from FIG. 11 according to embodiments of the invention.

FIG. 10 illustrates the gun lock from FIG. 9 according to embodiments of the invention.

Figure 11A:
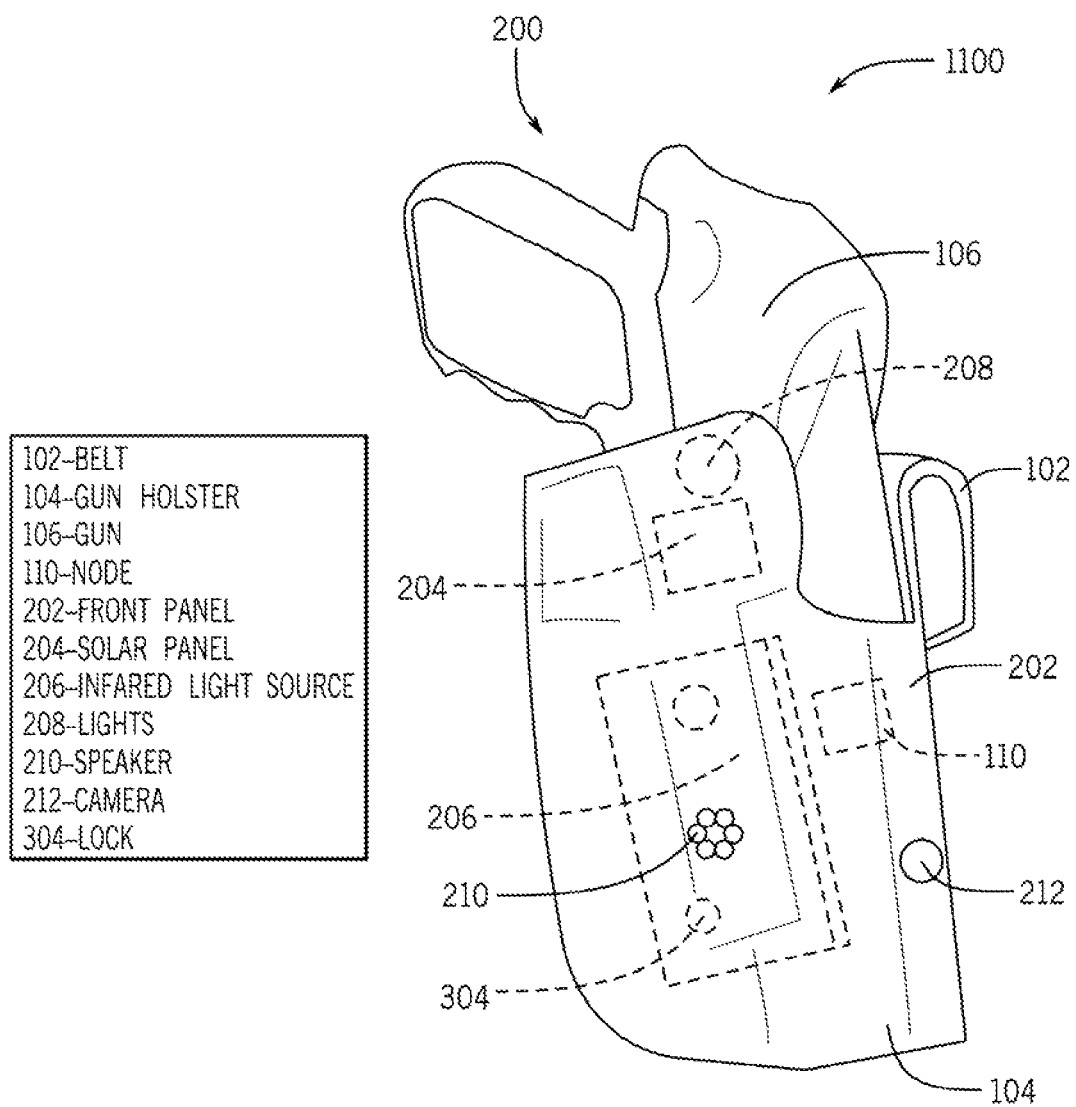
FIG. 11A-FIG. 11C illustrates a gun lock according to embodiments of the invention.
Figure 11B:
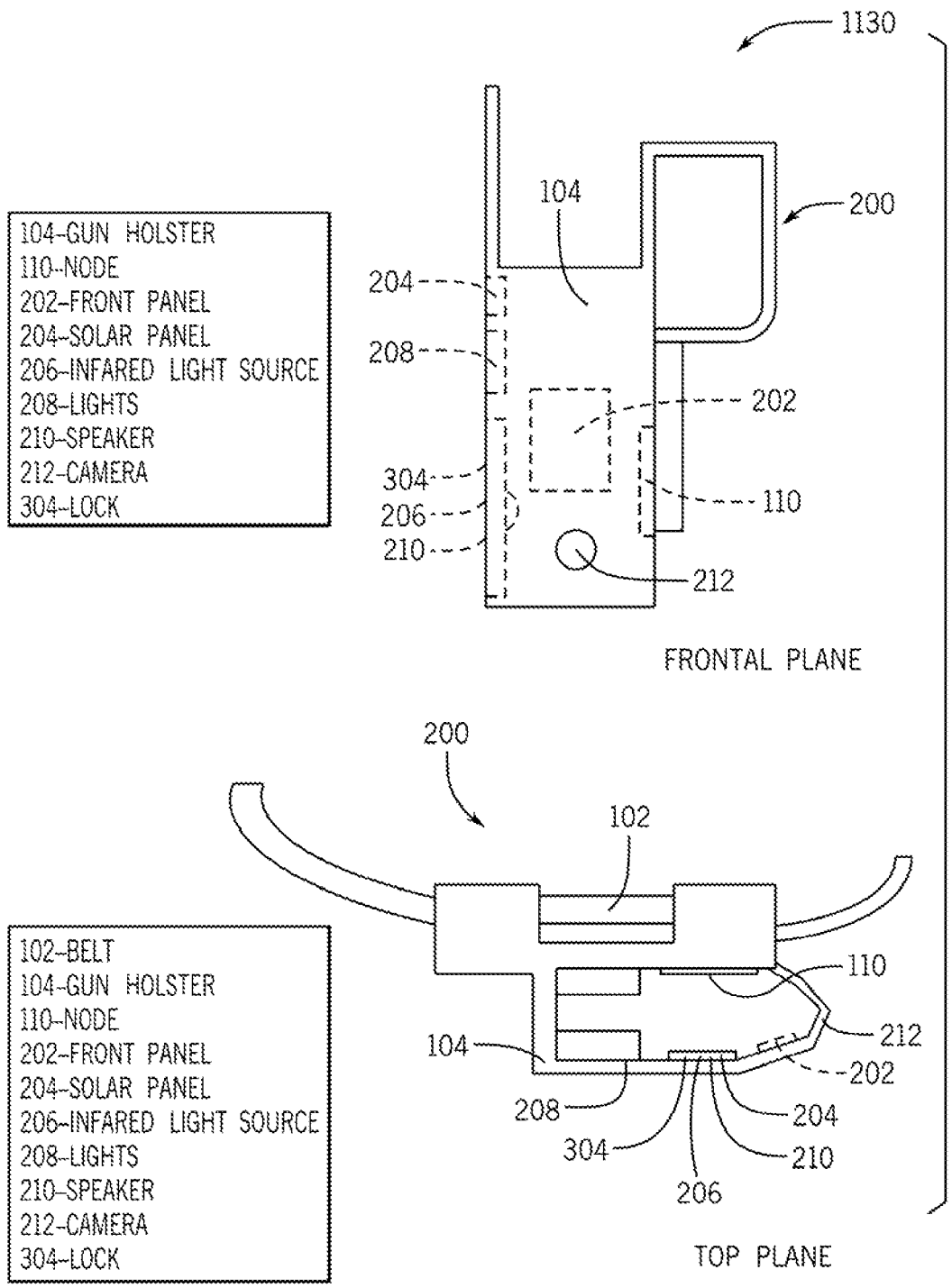
Figure 11C:
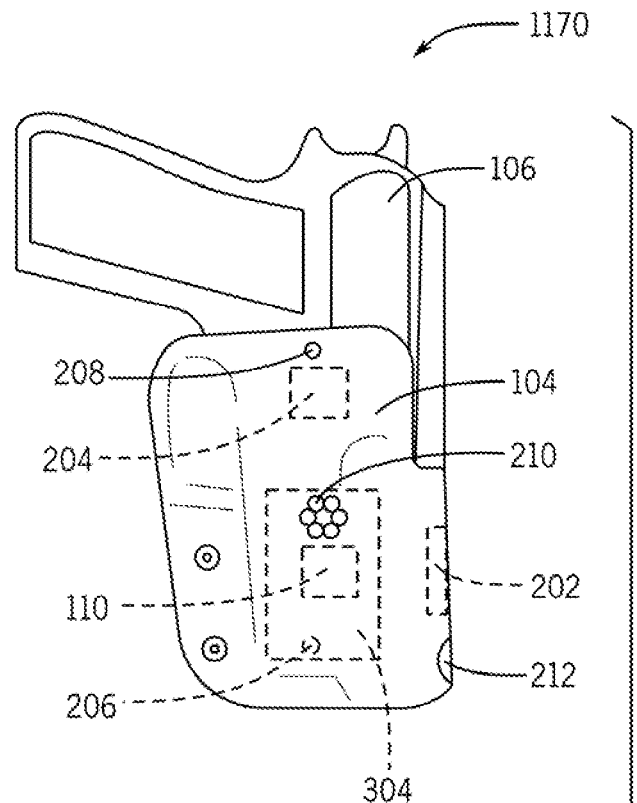
Figure 11C:
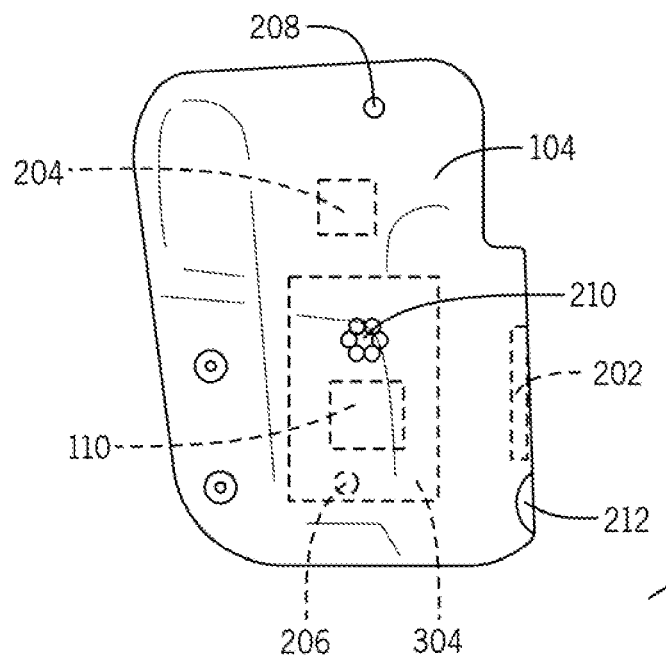

FIG. 11A-FIG. 11C illustrates a gun lock according to embodiments of the invention. With reference to FIG. 11A through FIG. 11C collectively, a gun lock 304 is integrated into a gun holster 104 to provide an external lock that prohibits use of the gun 106 by an unauthorized user. The gun holster 104 contains a lock 304 that functions as described above with an interference member that engages with a trigger guard of the handgun 106 locking the handgun 106 within the holster when the lock is in a locked state.

The locking holster 104 can include a node 110 that includes a microprocessor and one or more sensors such as an infrared light source 206. Infrared light source 206 can be used to sense a state of the locking holster 104. In different embodiments, the locking holster is configured with one or more of a battery, a light 208, a speaker 210, a camera 212, and a solar panel 204. The locking gun holster 104 has a front panel 202 and a belt loop 102 that can receive a belt. In some embodiments, the locking holster contains a lock operated by one or more biometric sensors such as a fingerprint sensor, voice detection sensor, or a camera for analysis of a potential user's eye (iris, etc.). In some embodiments the locking holster includes a microphone. A microprocessor contained within the node is used to process the potential user's speech, fingerprint, or image of an eye to determine whether the potential user is an authorized user. Upon a successful determination that the potential user is an authorized user the system places the lock in the open state and the user can move the gun from the holster. The lock provided by the locking holster is an external lock. No modification of the handgun is required for use with the locking holster 104.

In some embodiments, the node is configured for wireless communication with server in a remote location as described above. In some embodiments. the locking holster is configured to communicate with the server in a remote location and an authorized user can send commands to the locking holster to change a state of the locking holster such as but not limited to moving the lock mechanism from a locked state to an open state or vice versa. As described above, one or more lights 208 are provided in some embodiments to provide visual information about a state of the system to a user.

Figure 12:
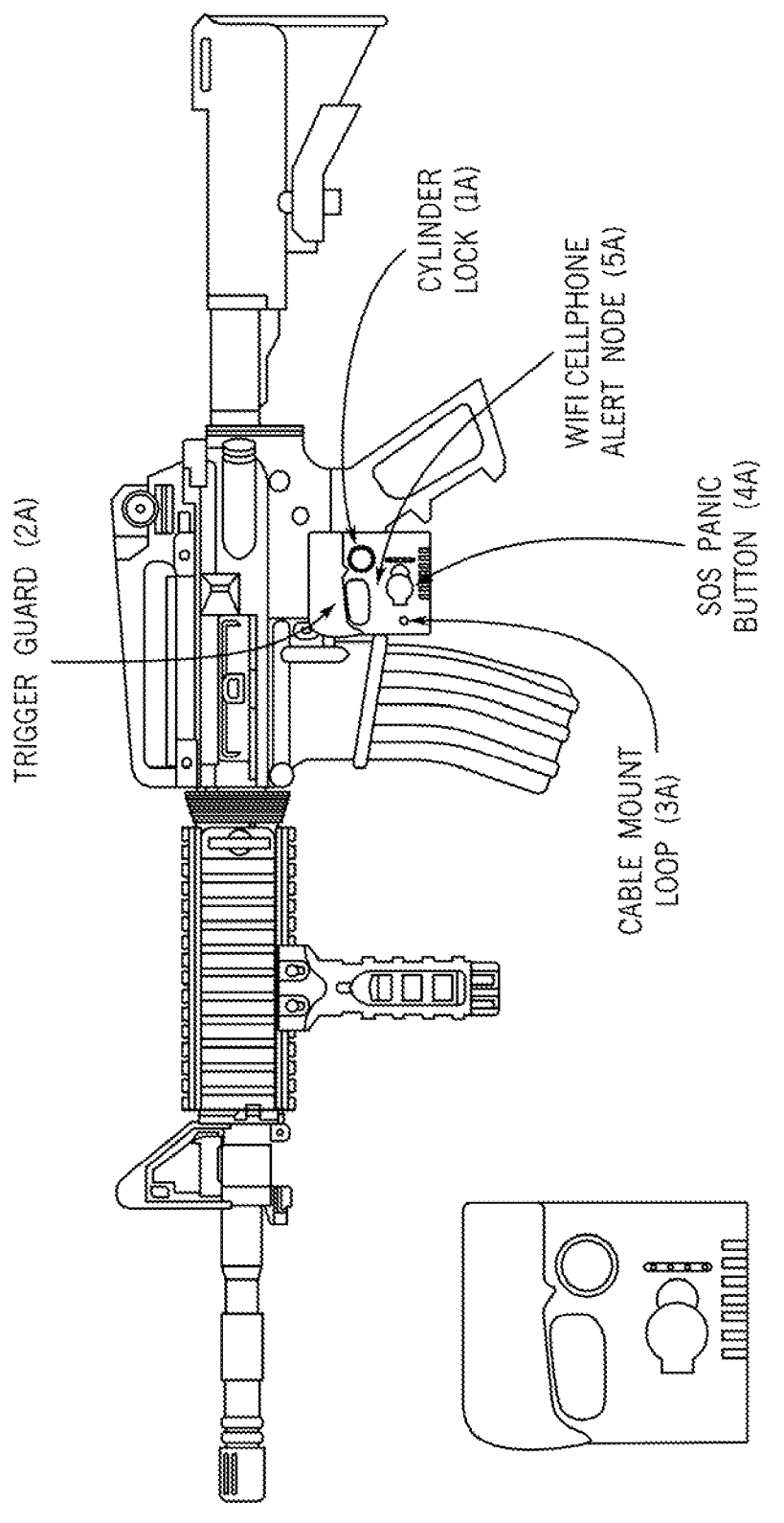
FIG. 12 illustrates a side view of a gun lock incorporated into rifle according to embodiments of the invention.

FIG. 12 illustrates a side view of a gun lock incorporated into a rifle according to embodiments of the invention. With reference to FIG. 12, a gun lock is installed on a rifle thereby locking the trigger such that the rifle cannot be fired while locked. Embodiments of the invention are readily utilized on any make and model of rifle. The rifle depicted in the drawings is shown only for illustration and no limitation is implied thereby. In the embodiment illustrated in FIG. 12, a cable mount loop 3A is provided for a tether. A tether is used to attach the lock to an object as described above. In some embodiments, a tether is used to connect the lock to a vehicle. Vehicles, as used in this description of embodiments, include but are not limited to, a personal vehicle, an emergency vehicle, a police vehicle, an armed forces vehicle, a national guard vehicle, etc. In some embodiments, the lock includes a wireless communication interface (5A) for communication with a network. In one or more examples, provided for illustration and with no limitation implied thereby, the wireless communication interface is a communication interface that utilizes a cellphone network and or a WIFI network, a wireless network utilizing different wireless protocol such as Bluetooth or the communications interface can be configured to switch between one or more wireless networks, The lock can contain a cylinder lock (1A) operated by a key as described above. The key mechanism can operate an interference member such as a wedge that moves into a trigger guard (2A) of the gun. In some embodiments, the lock is provided with an SOS panic button (4A) that can communicate with a network and notify an authorized user of the gun concerning an event.

Figure 13:
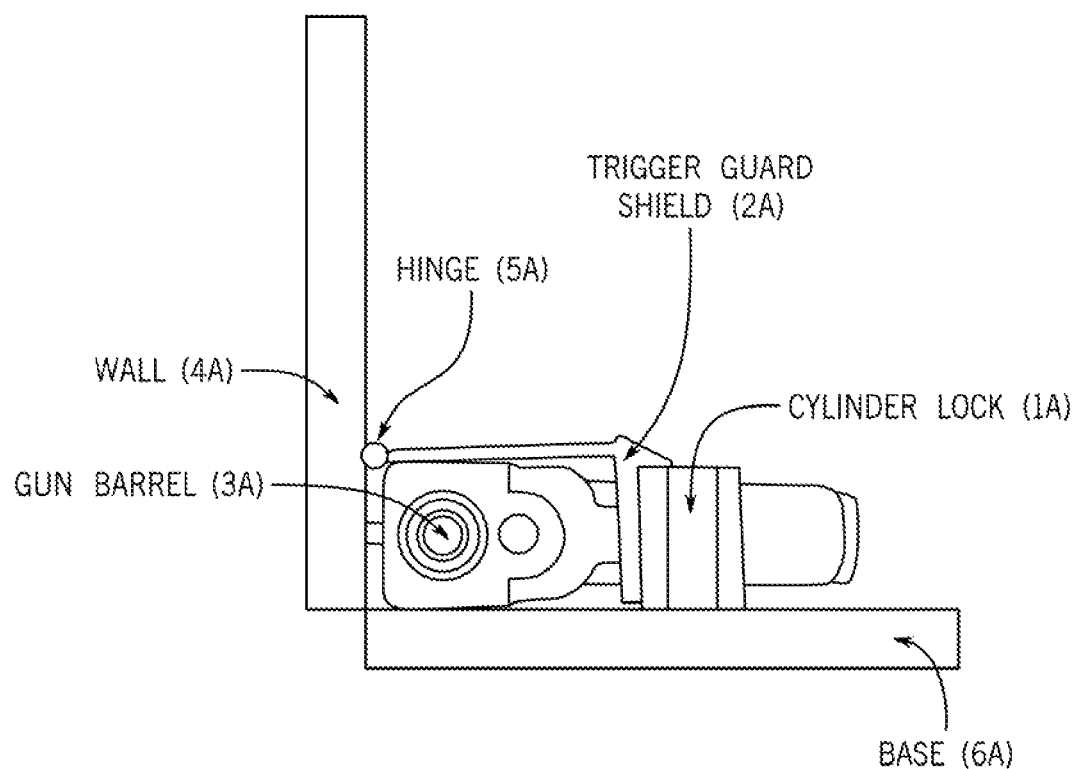
FIG. 13 illustrates a side view of a gun lock configured with a wall according to embodiments of the invention.

FIG. 13 illustrates a side view of a gun lock configured with a wall according to embodiments of the invention. With reference to FIG. 13, a gun lock (2A) is coupled to one or more of a wall (4A) and a base (6A). The wall (4A) and the base (6A) are further examples of coupling the lock to an object in conjunction with the teachings described above. A cylinder lock (1A) is operable to lock and unlock a trigger shield guard (2A) thereby releasing the gun from the lock. A gun barrel (3A) of the gun is illustrated in FIG. 13. The trigger guard shield (2A) is attached by a hinge (5A) to the wall (4A). In operation, in the open state, the trigger guard shield rotates up to release the gun. In a locked state the cylinder lock (1A) places an interference member in the trigger guard and locks the trigger guard shield to the base (6A). The gun lock can be incorporated with a node and sensors as described above to provide remote operation and interact with a network as described above.

Figure 14:
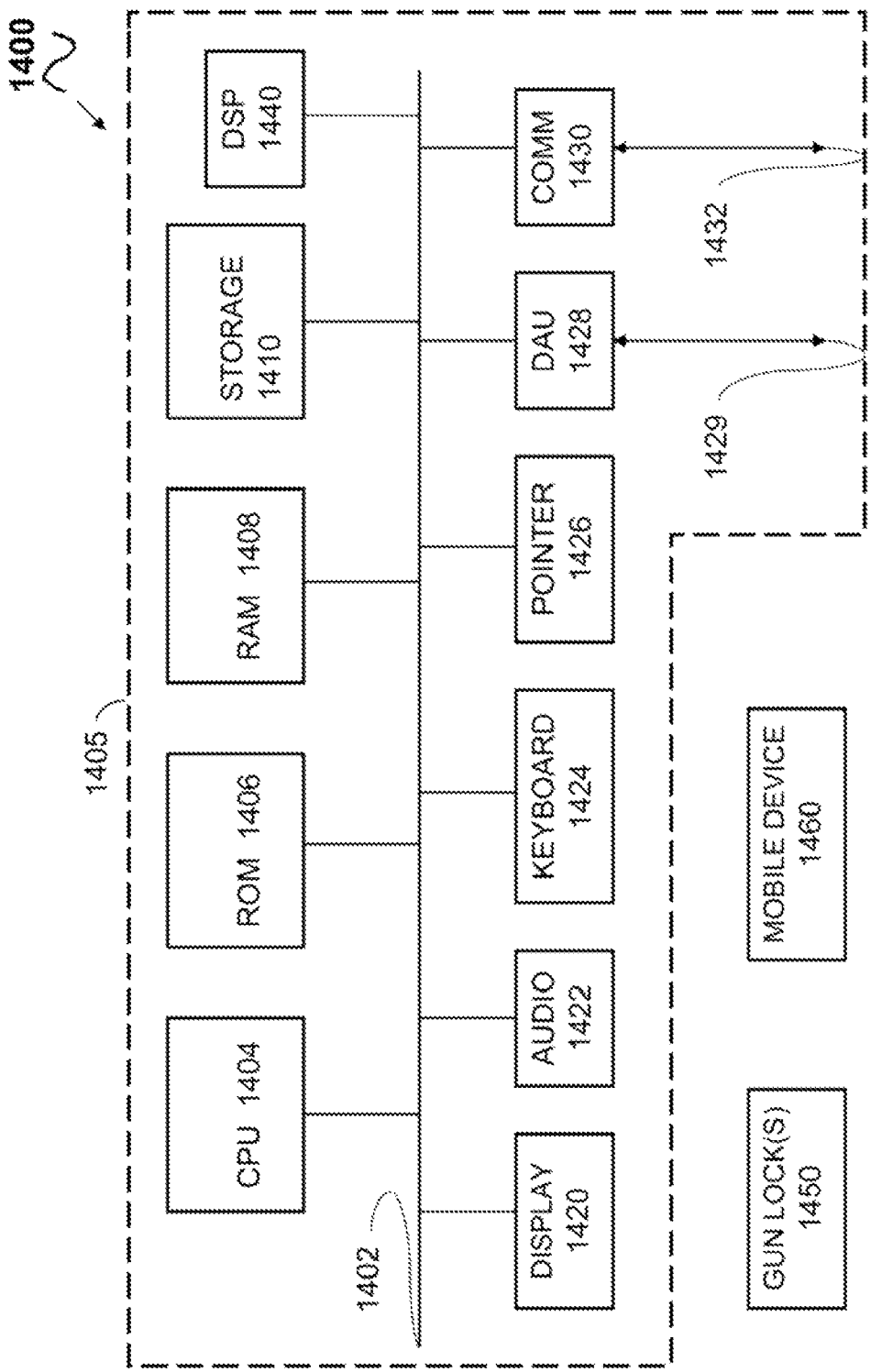
FIG. 14 illustrates a communications network configured for use with a gun lock according to embodiments of the invention.

FIG. 14 illustrates a communications network (system) 1400 configured for use with a gun lock(s) according to embodiments of the invention. With reference to FIG. 14, a host 1405 includes a bus system 1402, which interconnects a Central Processing Unit (CPU) 1404, Read Only Memory (ROM) 1406, Random Access Memory (RAM) 1408, storage 1410, display 1420, audio 1422, keyboard 1424, pointer 1426, data acquisition unit (DAU) 1428, and communications 1430. The bus system 1402 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), or a dedicated bus designed for a custom application, etc. The CPU 1404 may be a single, multiple, or even a distributed computing resource or a digital signal processing (DSP) chip. Storage 1410 may be Compact Disc (CD), Digital Versatile Disk (DVD), hard disks (HD) optical disks, tape, flash, memory sticks, video recorders, etc. The system 1400 is configured and used to communicate with one or more gun locks indicated at 1450. Note that depending upon the actual implementation of the system, the system may include some, all, more, or a rearrangement of components in the block diagram. In some embodiments, aspects of the system 1400 are performed in software. While in some embodiments, aspects of the system 1400 are performed in dedicated hardware such as a digital signal processing (DSP) chip 1440, or a system on a chip (SOC) which can also be represented at 1440, etc. as well as combinations of dedicated hardware and software as is known and appreciated by those of ordinary skill in the art.

Thus, in various embodiments, data is received at 1429 and or 1432 from one or more gun locks 1450 so equipped with a communications interface as described above for processing by the system 1400. Such data can be transmitted at 1432 via communications interface 1430 for further processing in a remote location. Connection with a network, such as an intranet or the Internet is obtained via 1432, as is recognized by those of skill in the art, which enables the system 1400 to communicate with other data processing devices, such as but not limited to a mobile device 1460 or other system(s) in remote locations (not shown). The mobile device 1460 can be any of a mobile phone, laptop computer, tablet computer, desk top computer, etc.

In one or more embodiments, an application program is configured to run on CPU 1404, whereby the application program receives signals through the system 1400 responsive to the state of one or more gun locks 1450. For example, if a gun is secured in a gun lock 1450 a signal is sent from the gun lock 1450 indicating "gun in lock." Alternatively, if the gun is not in the lock the gun lock 1450 sends a signal so indicating, "gun not in lock." The application program is configured to contact a mobile device that is associated with the gun lock 1450, thereby notifying the a mobile device 1460 of the status of the gun lock 1450, i.e., "gun in lock" or "gun not in lock." The status of the gun lock(s) 1450 can be displayed to a user of the mobile device 1460 on an application program running on the mobile device 1460. Status of the gun lock can include, but is not limited to, gun lock is in a "locked" state or lock is in an "open" state. In operation the mobile device 1460 is in communication with the host 1405 continuously monitoring and updating the status of the gun lock(s) 1450. The system 1400 including embodiments of the invention that report an event occurring at a gun lock and/or a status of a gun lock are capable of being deployed and used as described in conjunction with U.S. patent application Ser. No. 13/938,437 titled "SYSTEMS AND METHODS FOR WIRELESS MONITORING A RECEPTACLE FOR A GUN." For mobile devices equipped with an application software program to operate a gun lock 1450, a user can send a command with a mobile device 1460 that causes the gun lock 1450 to respond thereto. Examples of such commands are, but are not limited to place the gun lock in a "locked" state, or place the gun lock in an "open" state, etc.

Embodiments of the invention can be implemented on a host 1405 configured as a desktop computer or work station, on for example a WINDOWS® compatible computer running operating systems such as WINDOWS® XP Home or WINDOWS® XP Professional, WINDOWS® 10 Home or WINDOWS® 10 Professional, Linux, Unix, etc. as well as computers from APPLE COMPUTER, Inc. running operating systems such as OS X, etc. Alternatively, or in conjunction with such an implementation, embodiments of the invention can be configured with devices such as speakers, earphones, video monitors, etc. configured for use with a Bluetooth communication channel. In yet other implementations, embodiments of the invention are configured to be implemented by mobile devices such as a smart phone, a tablet computer, or the like.

FIGS. 15A-D illustrate various lock arrangements, some of which incorporate a biometric according to embodiments of the invention. With reference to FIGS. 15A-D collectively, a locking device for a gun is illustrated. A mechanical lock C is configured to rotate between an open position and locked position. When in the locked position, the lock C can be locked secondarily by a lock (secondary lock) operable through the biometric sensor and microprocessor. In one or more embodiments, the secondary lock is opened by successful match of a user's fingerprint recorded by the biometric sensor and compared against fingerprints of permitted users. Such functionality is accomplished by use of the biometric reader and microprocessor.

The secondary lock is an electromechanical lock that is implemented in various embodiments using a movable mechanical stop via microprocessor control. In various embodiments, for illustration only with no limitation implied thereby, movable mechanical stops can be provided by a hydraulic piston device, an electro-mechanical solenoid, an electric motor and threaded rod assembly, etc.

In some embodiments, the biometric reader is used to release the mechanical lock C without the need for a key. A kill switch can be incorporated to disable the biometric device and lock which places the lock back into manual mode thereby requiring a key for lock and unlock functionality.

In operation, a firearm is inserted into the lock (which can be configured as a holster). Once inserted, the microprocessor can either lock the firearm into the holster or leave the lock in the open state. If the firearm is locked, the kill switch (if provided) can be used to quickly disable the lock and place the lock in the open state.

In another mode of operation, if the cylinder lock is left on the lock position and the gun is inserted in the holster. The gun will automatically lock inside of the holster. If the lock is left in the unlock position and the gun is inserted the gun will not be locked inside of the holster unless the microprocessor is on and programmed to lock the gun inside of the holster.

In some embodiments, a user can lock and unlock the gun lock (holster) with a biometric fingerprint reader in conjunction with a microprocessor that controls all the lock and communications features. A user can store, in local memory, many different fingerprints that can be used to unlock the gun that is located inside of the lock or holster. In operation in some embodiments, when a user puts his/her finger on the fingerprint reader a match results, the flex lock wedge will be removed from the trigger guard allowing the gun to be removed from the holster. If the user puts his/her finger on the fingerprint reader and it does not match what is stored in memory, the light will turn red and the holster will stay looked.

In some embodiments, in operation with the microprocessor on, the user puts his/her finger on the reader. The fingerprint reader uses the microprocessor and memory to detect a match between the user's fingerprint and one or more authorized fingerprints stored in memory. If there is a match the small hydraulic post (or similar mechanism) will move out of the way allowing the flex lock wedge to be removed from the trigger guard so the end user can access the gun quickly. If the microprocessor is off, and the gun is locked inside of the holster, the user can take a key and unlock the holster in which the flex lock wedge will be removed from the trigger guard so that the gun can be removed from the holster quickly. A belt clip on the holster is used to clip the holster on to a belt, pants and also a gun case.

Figure 16A:
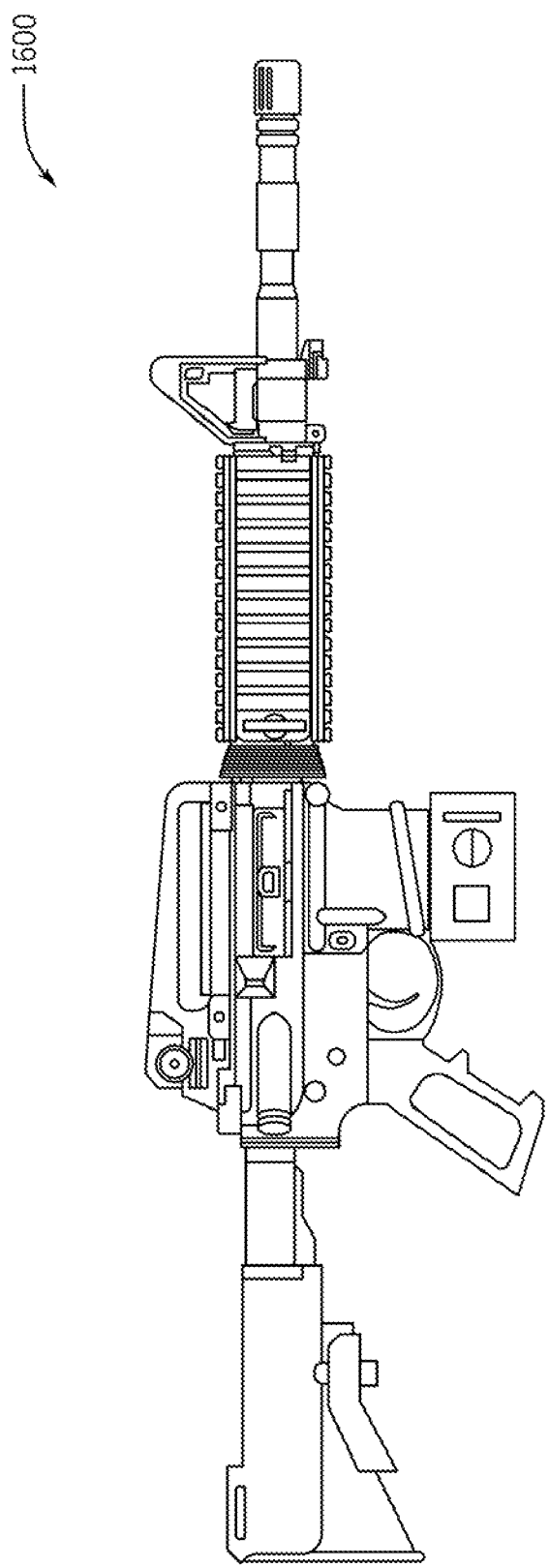
FIG. 16A Illustrates a gun lock configured as a magazine lock installed on a rifle according to embodiments of the invention.

FIG. 16A illustrates, generally at 1600, a gun lock configured as a magazine lock installed on a rifle according to embodiments of the invention. With reference to FIG. 16A, a magazine lock is inserted into a magazine opening for a rifle. The rifle shown in FIG. 16A has an external magazine and the magazine lock is inserted in place of a magazine that contains ammunition. The magazine lock prevents ammunition from loading into a chamber of the gun thereby effectively locking the gun such that it cannot fire. Magazine locks are also configured for use in guns that have internal magazines. A gun with an internal magazine receives ammunition held by a device referred to in the art as a clip. Thus, when a lock is configured for use in a gun with an internal magazine such a lock can be referred to as a clip lock. However, as used in this description of embodiments both a magazine lock and a clip lock are referred to herein as a magazine lock without any limitation.

Figure 16B:
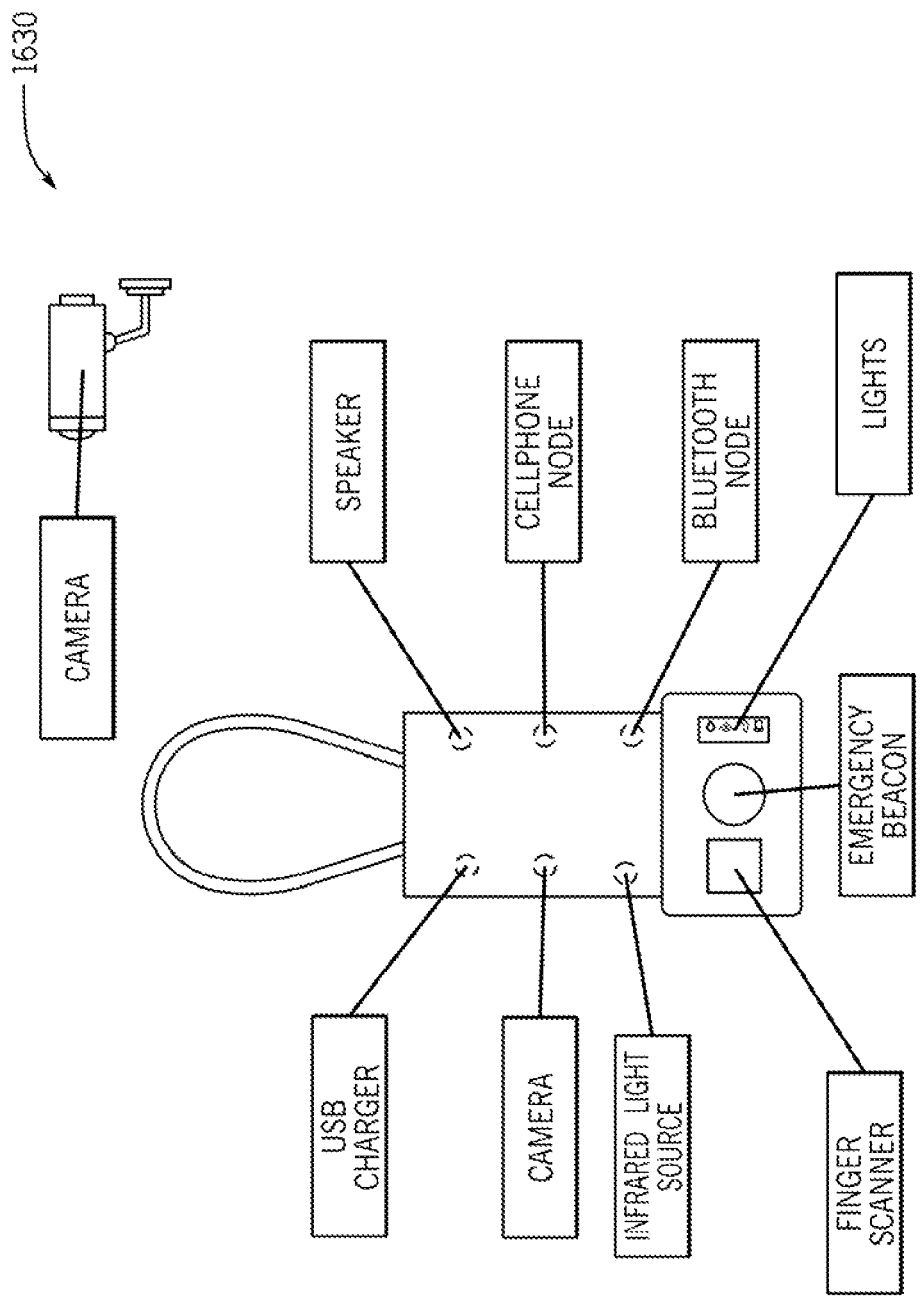
FIG. 16B illustrates a gun lock configured as a magazine lock according to embodiments of the invention.

FIG. 16B illustrates, generally at 1630, a gun lock configured as a magazine lock according to embodiments of the invention. FIG. 16C illustrates, generally at 1630, a gun lock configured as a magazine lock on a wireless charger according to embodiments of the invention. With reference to FIG. 16A and FIG. 16B collectively, in one or more embodiments a magazine lock has an interference member configured in the form of a loop attached at one end the magazine lock. In operation, the loop is inserted into a magazine opening and pushed up and out of the chamber. The magazine lock has a cross-section sized similar to a magazine designed for the gun such that a portion of the magazine lock enters the magazine opening. The loop coming out of the chamber presents itself for capture by a pad lock. When the pad lock captures the end of the loop exiting the chamber the magazine lock cannot be removed from the magazine opening effectively locking the gun. In the locked state, ammunition cannot be loaded into the chamber and the gun cannot be fired. In various embodiments, the magazine lock can be configured with one or more of a node, a microprocessor, a biometric sensor, a mechanical key lock (cylindrical or flat key), battery, solar panel, inductive charging device, infrared light source, cell phone communications, Bluetooth communications, a node containing a microprocessor, status lights, speaker, etc. All of the functionality described above in conjunction with the gun locks previously described can be configured into a magazine lock. The loop can be made out of various materials, such as but not limited to, a flexible steel cable, a fiber cable, a cable made from a flat strap, etc.

Interference members can be provided in different forms with a magazine lock. For example, in some embodiments, a cable is not supplied, instead, a magazine lock has an interference member in the form of a linear arm with a curved end that extends up and over the top of the gun, capturing the gun thereby. To lock the magazine lock, the curved end is drawn down against the top of the gun and the linear arm is held fast by a locking mechanism such that relative motion between the linear arm and the magazine lock is prevented while in a locked state. In one or more embodiments, the linear arm has a series of teeth or notches and the locking mechanism mates with the teeth or notches of the linear arm thereby preventing the linear arm from moving relative to the magazine lock. To open the gun lock, the user utilizes a key to change the state of the locking mechanism to the open position. When the locking mechanism is in the open position, the teeth or notches are released, thereby the linear arm can move relative to the magazine lock and the magazine lock can be removed from the gun.

Figure 17:
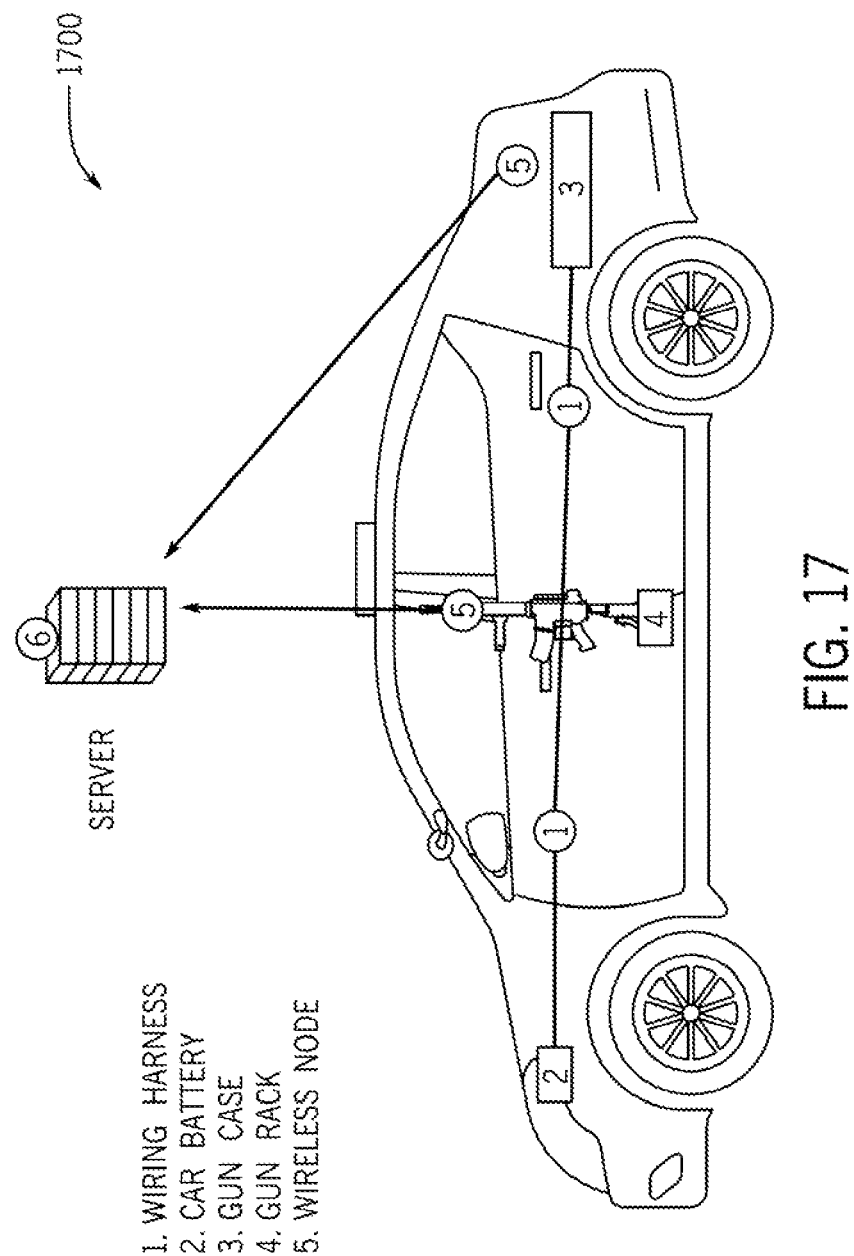
FIG. 17 Illustrates gun locks installed in a vehicle according to embodiments of the invention.

FIG. 17 illustrates, generally at 1700, gun locks installed in a vehicle according to embodiments of the invention. With reference to FIG. 17, one or more gun locks are mounted to a vehicle. A gun lock that is configured into a gun rack is mounted in a vehicle. The gun rack is mounted to the vehicle. When the gun is secured to the gun rack, the gun can be locked to the gun rack utilizing any of the gun locks described above. The gun rack can be connected to the vehicle's wiring harness in order to receive a source of electrical power from the vehicle and to power the gun rack. A gun lock can also be locked in another part of the vehicle such as the trunk. A gun lock located in the trunk can be in the form of a locked box. The locked box can be used to lock ammunition and or guns. Nodes located in the gun rack and ire the locked box in the truck can communicate wirelessly with a server in a remote location thereby providing all of the functionality previously described. The communication nodes located with the gun rack or the locked box in the truck can be configured with cellular communication equipment in order to reach the network in the remote location thereby providing access to a server which is part of the system described herein.

Figure 18:
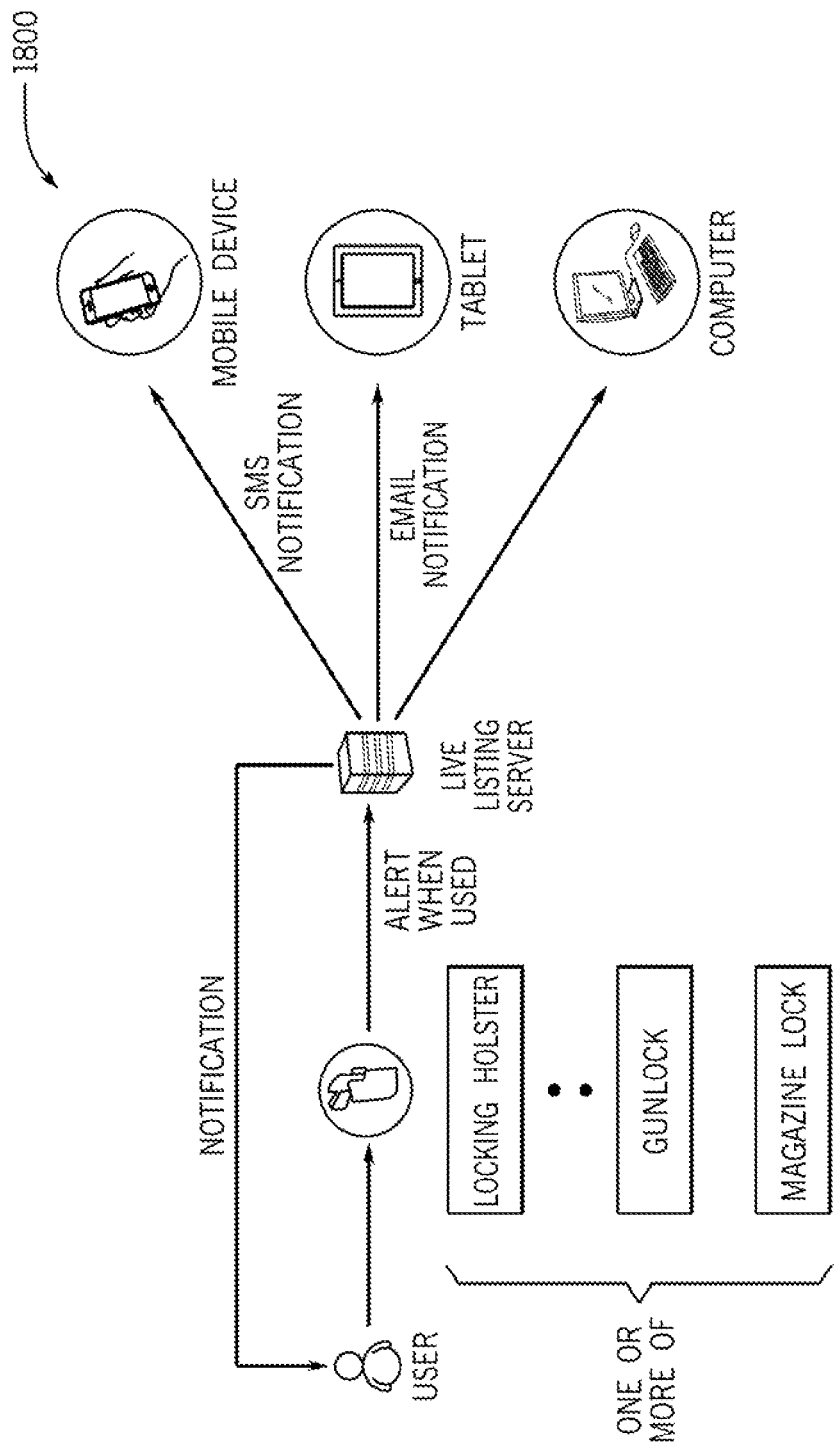
FIG. 18 Illustrates a system in which gun locks are used according to embodiments of the invention.

FIG. 18 illustrates, generally at 1800, a system in which gun locks are used according to embodiments of the invention. With reference to FIG. 18, a user operates one or more wirelessly enabled devices such as a gun lock, a magazine lock, a gun rack, a lock, box, etc. to lock or unlock a gun or ammunition. The gun lock communicates with a server in a remote location. The server can communicate with the user via a wirelessly enabled mobile device such as but not limited to a computer, a laptop computer, a tablet computer, a mobile phone, a watch, a wrist band, etc. The communication includes a status of the gun lock, gun rack, lock box, etc. When the user has an application program loaded on the user's mobile device the user can change the state of the lock in the gun lock, gun rack, lock box, etc.

The gun locks described in embodiments herein can be used with any form of carry, such as but not limited to a waistband holster, outside of the waistband, open carry, bellyband, ankle band, bra band, appendix carry, side torso, small of back carry, left or right chest holster carry. In all methods of carry the gun locks taught herein is are external locks that are used with any gun without modification of the gun. Thus, embodiments of the invention prevent unauthorized use of a gun by restricting access to only authorized users of the gun. In other words, unauthorized users of a gun cannot fire the gun.

In various embodiments, the components of systems described in the previous figures are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized, and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. Embodiments of the invention can also be practiced in distributed computing environments where tasks are performed by remote processing devices that are linked through a communications network. In other examples, embodiments of the invention as described in the figures above can be implemented using a system on a chip (SOC), a digital signal processing (DSP) chip, or in other implementations of hardware and software.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a for readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What I claim is:

1. An external lock apparatus for a gun, comprising:
   a magazine lock, the magazine lock is configured to be inserted into a magazine opening of the gun, wherein the magazine lock further comprising:
   an external lock, the external lock is configured to engage with the magazine lock when the magazine lock is inserted into the magazine opening, the external lock has on OPEN position and a LOCKED position, the external lock further comprising:
   an interference member, the interference member is configured to engage with the gun, the magazine lock cannot be removed from the magazine opening and ammunition cannot be loaded into a chamber of the gun when the magazine lock is inserted into the magazine opening, and the external lock is in the LOCKED position, in the alternative, ammunition cannot be loaded into the chamber, but the magazine lock can be removed from the magazine opening if the following two conditions are met,
   a. the magazine lock is engaged with the magazine opening, and
   b. external lock is in the OPEN position, wherein the interference member is a flexible loop of material that passes into and out of the chamber when the magazine lock is inserted into the magazine opening and the external lock is a padlock, the padlock is used to capture the flexible loop of material which places the magazine lock in the LOCKED position.

2. The apparatus of claim 1 wherein the flexible loop is made from stranded metal cable.

3. An external lock apparatus for a gun, comprising:
   a magazine lock, the magazine lock is configured to be inserted into a magazine opening of the gun, wherein the magazine lock further comprising:
   an external lock, the external lock is configured to engage with the magazine opening when the magazine lock is inserted into the magazine opening, the external lock has on OPEN position and a LOCKED position, the external lock further comprising:
   an interference member, the interference member is configured to engage with the gun, the magazine lock cannot be removed from the magazine opening and ammunition cannot be loaded into a chamber of the gun when the magazine lock is inserted into the magazine opening, and the external lock is in the LOCKED position, in the alternative, ammunition cannot be loaded into the chamber, but the magazine lock can be removed from the magazine opening if the following two conditions are met,
  a. the magazine lock is engaged with the magazine opening, and
  b. external lock is in the OPEN position;
  a sensor node, the sensor node is incorporated into the magazine lock, the sensor node further comprising:
    a sensor, the sensor is configured to emit energy and to receive reflected energy;
    a logic block, the logic block is configured to receive signals from the sensor node, wherein the signals are related to emitted energy and received reflected energy and to estimate a distance between the sensor and the magazine lock; and
    a wireless communications interface, the wireless communications interface is configured to send a status of the magazine lock to a remote device based on the distance.

4. The apparatus of claim 3, wherein the sensor utilizes an infrared portion of the electromagnetic energy spectrum.

5. The apparatus of claim 4, wherein the sensor measures a quantity selected from the group consisting of motion, light, temperature, humidity, and time.

6. The apparatus of claim 1, wherein the magazine opening is an opening for a clip and the gun has an internal magazine.

7. The apparatus of claim 3, wherein the magazine opening is an opening for a clip and the gun has an internal magazine.

8. The apparatus of claim 3, wherein the remote device is selected from the group consisting of a mobile phone, tablet computer, laptop computer, desk top computer, smart device, and a server.

9. The apparatus of claim 3, wherein the wireless communications interface utilizes a wireless protocol selected from the group consisting of mobile phone network, Internet, intranet, and satellite network.

10. The apparatus of claim 3, wherein the status is related to one of the following two states:
  1.) LOCKED position, and
  2.) OPEN position.

11. The apparatus of claim 10, wherein the logic block is further configured to compute a change in the status of the external gun lock and to send a notification to an authorized entity of the change, wherein the notification is sent to the remote device.

* * * * *